US008923634B2

(12) United States Patent
Sasai et al.

(10) Patent No.: US 8,923,634 B2
(45) Date of Patent: Dec. 30, 2014

(54) IMAGE CODING METHOD, IMAGE CODING APPARATUS, IMAGE DECODING METHOD AND IMAGE DECODING APPARATUS

(71) Applicant: Panasonic Corporation, Osaka (JP)

(72) Inventors: Hisao Sasai, Osaka (JP); Takahiro Nishi, Nara (JP); Youji Shibahara, Osaka (JP); Toshiyasu Sugio, Osaka (JP); Kyoko Tanikawa, Osaka (JP); Toru Matsunobu, Osaka (JP); Kengo Terada, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 14/043,099

(22) Filed: Oct. 1, 2013

(65) Prior Publication Data

US 2014/0029863 A1 Jan. 30, 2014

Related U.S. Application Data

(63) Continuation of application No. 13/669,690, filed on Nov. 6, 2012, now Pat. No. 8,670,625.

(60) Provisional application No. 61/556,406, filed on Nov. 7, 2011.

(51) Int. Cl.

| G06K 9/36 | (2006.01) |
|---|---|
| G06T 9/00 | (2006.01) |
| G09G 5/02 | (2006.01) |
| H04N 1/405 | (2006.01) |
| H04N 1/32 | (2006.01) |
| H04N 1/41 | (2006.01) |
| H04N 7/12 | (2006.01) |
| H04N 11/02 | (2006.01) |
| H04N 11/04 | (2006.01) |
| G06F 15/00 | (2006.01) |
| G06F 7/00 | (2006.01) |
| H04N 19/593 | (2014.01) |

(52) U.S. Cl.
CPC ............ *H04N 19/00763* (2013.01); *G06T 9/00* (2013.01)

USPC ........... 382/232; 382/237; 345/555; 345/596; 345/690; 341/56; 358/3.06; 358/426.01; 375/240.01; 708/203

(58) Field of Classification Search
None
See application file for complete search history.

(56) References Cited

U.S. PATENT DOCUMENTS 4,651,193 A * 3/1987 Catros ...................... 375/240.01
5,010,401 A * 4/1991 Murakami et al. ........ 375/240.16

(Continued)

FOREIGN PATENT DOCUMENTS

JP 2004-064725 2/2004

OTHER PUBLICATIONS

Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, Document: JCTVC-F803_d5, Ver. 6, 6th Meeting: Torino, IT, Jul. 14-22, 2011.

(Continued)

*Primary Examiner* — Randolph I Chu

(74) *Attorney, Agent, or Firm* — Greenblum & Bernstein, P.L.C.

(57) ABSTRACT

A decoding method decodes last position information indicating horizontal and vertical positions of a last non-zero coefficient in a predetermined order within a current block to be decoded, the current block including plural coefficients. The decoding includes obtaining a bitstream including first, second, third and fourth partial signals, in this order, performing first arithmetic decoding on the first and the third partial signals respectively to obtain decoded first and decoded third partial signals, performing second arithmetic decoding on the second and the fourth partial signals respectively to obtain decoded second and decoded fourth partial signals, the second arithmetic decoding being different from the first arithmetic decoding, deriving a horizontal component of the last position information from the decoded first and decoded third partial signals, and deriving a vertical component of the last position information from the decoded second and decoded fourth partial signals.

4 Claims, 40 Drawing Sheets

(56) References Cited

U.S. PATENT DOCUMENTS

| | | | |
|---|---|---|---|
| 7,281,033 B2* | 10/2007 | Le Leannec et al. | 709/217 |
| 8,320,447 B2* | 11/2012 | Miyazaki | 375/240.01 |
| 2006/0045178 A1* | 3/2006 | Schu et al. | 375/240.01 |
| 2007/0160150 A1* | 7/2007 | Chujoh et al. | 375/240.23 |
| 2009/0201994 A1* | 8/2009 | Schwarz et al. | 375/240.18 |
| 2009/0201996 A1* | 8/2009 | Schwarz et al. | 375/240.18 |
| 2010/0303147 A1* | 12/2010 | Miyazaki | 375/240.02 |
| 2012/0287989 A1* | 11/2012 | Budagavi et al. | 375/240.03 |
| 2013/0027230 A1* | 1/2013 | Marpe et al. | 341/107 |
| 2013/0094779 A1* | 4/2013 | Budagavi et al. | 382/260 |
| 2013/0142253 A1* | 6/2013 | Sasai et al. | 375/240.03 |

OTHER PUBLICATIONS

Tzu-Der Chuang et al., "Non-CE1: Codeword reordering for last_significant_coeff_x and last_significant_coeff_y", JCTVC-G201, Joint Collaborative Team on Video Coding (JCT-VC) of ITU-T SG16 WP3 and ISO/IEC JTC1/SC29/WG11, pp. 1-3, Nov. 21, 2011.

Vadim Seregin et al., "Binarisation modification for last position coding", JCTVC-F375, Joint Collaborative Team on Video Coding (JCT-VC) of ITU-T SG16 WP3 and ISO/IEC JTC1/SC29/WG11, pp. 1-3, Jul. 14, 2011.

Hisao Sasai, "Modified MVD coding for CABAC", JCTVC-F423, Joint Collaborative Team on Video Coding (JCT-VC) of ITU-T SG16 WP3 and ISO/IEC JTC1/SC29/WG11, pp. 1-6, Jul. 14, 2011.

International Search Report (including PCT/ISA/220, PCT/ISA/210, and PCT/ISA/237), mailed Jan. 29, 2013, for corresponding PCT International Application No. PCT/JP2012/007069.

"Advanced video coding for generic audiovisual services", ITU-T Recommendation H. 264, Mar. 2010.

"WD4: Working Draft 4 of High-Efficiency Video Coding", Joint Collaborative Team on Video Coding (JCT-VC) of ITU-T SG16 WP3 and ISO/IEC JTC1/SC29/WG11, 6th Meeting: Torino, IT, JCTVC-F803 d2, Jul. 14-22, 2011.

* cited by examiner

FIG. 3A

| Last value | Prefix part |
|---|---|
| 0 | 1 |
| 1 | 01 |
| 2 | 001 |
| 3 | 000 |

FIG. 3B

| Last value | Prefix part | Suffix part |
|---|---|---|
| 0 | 1 | |
| 1 | 01 | |
| 2 | 001 | |
| 3 | 0001 | |
| 4 | 0000 | 00 |
| 5 | 0000 | 10 |
| 6 | 0000 | 01 |
| 7 | 0000 | 11 |

FIG. 3C

| Last value | Prefix part | Suffix part |
|---|---|---|
| 0 | 1 | |
| 1 | 01 | |
| 2 | 001 | |
| 3 | 0001 | |
| 4 | 00001 | |
| 5 | 000001 | |
| 6 | 0000001 | |
| 7 | 00000001 | |
| 8 | 00000000 | 000 |
| 9 | 00000000 | 100 |
| 10 | 00000000 | 010 |
| 11 | 00000000 | 110 |
| 12 | 00000000 | 001 |
| 13 | 00000000 | 101 |
| 14 | 00000000 | 011 |
| 15 | 00000000 | 111 |

FIG. 3D

| Last value | Prefix part | Suffix part |
|---|---|---|
| 0 | 1 | |
| 1 | 01 | |
| 2 | 001 | |
| 3 | 0001 | |
| 4 | 00001 | |
| 5 | 000001 | |
| 6 | 0000001 | |
| 7 | 00000001 | |
| 8 | 000000001 | |
| 9 | 0000000001 | |
| 10 | 00000000001 | |
| 11 | 000000000001 | |
| 12 | 0000000000001 | |
| 13 | 00000000000001 | |
| 14 | 000000000000001 | |
| 15 | 0000000000000001 | |
| 16 | 0000000000000000 | 0000 |
| 17 | 0000000000000000 | 1000 |
| 18 | 0000000000000000 | 0100 |
| ⋮ | ⋮ | ⋮ |
| 31 | 0000000000000000 | 1111 |

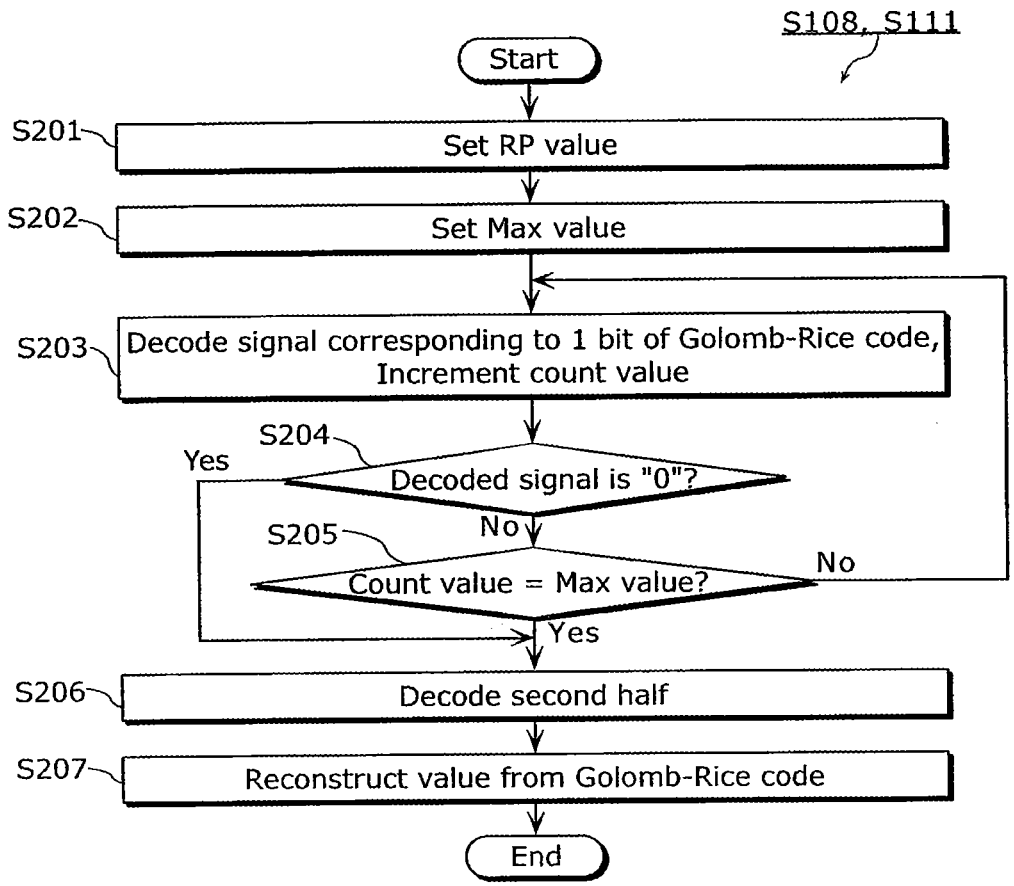

FIG. 9D
| Size | RP |
|---|---|
| 32 | 3 |
| 16 | 2 |
| 8 | 1 |
| 4 | 0 |
FIG. 9E
| Size | RP |
|---|---|
| 32 | 2 |
| 16 | 2 |
| 8 | 1 |
| 4 | 0 |
FIG. 10A
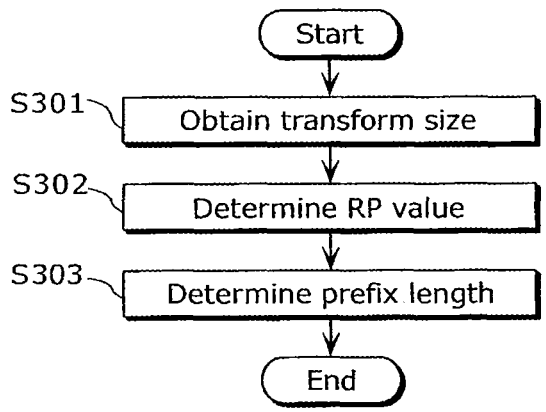
FIG. 10B
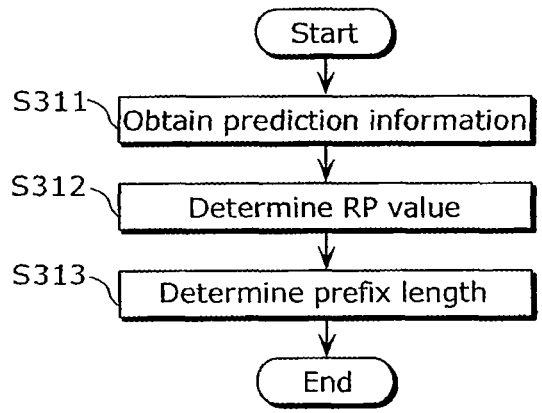

FIG. 15

| Last value | Prefix part | Suffix part | |
|---|---|---|---|
| 0 | 1 | | |
| 1 | 01 | | |
| 2 | 001 | | |
| 3 | 0001 | | |
| 4 | 0000 | 0 | 00 |
| 5 | 0000 | 0 | 10 |
| 6 | 0000 | 0 | 01 |
| 7 | 0000 | 0 | 11 |
| 8 | 0000 | 10 | 00 |
| 9 | 0000 | 10 | 10 |
| 10 | 0000 | 10 | 01 |
| 11 | 0000 | 10 | 11 |
| 12 | 0000 | 11 | 00 |
| 13 | 0000 | 11 | 10 |
| 14 | 0000 | 11 | 01 |
| 15 | 0000 | 11 | 11 |

FIG. 26
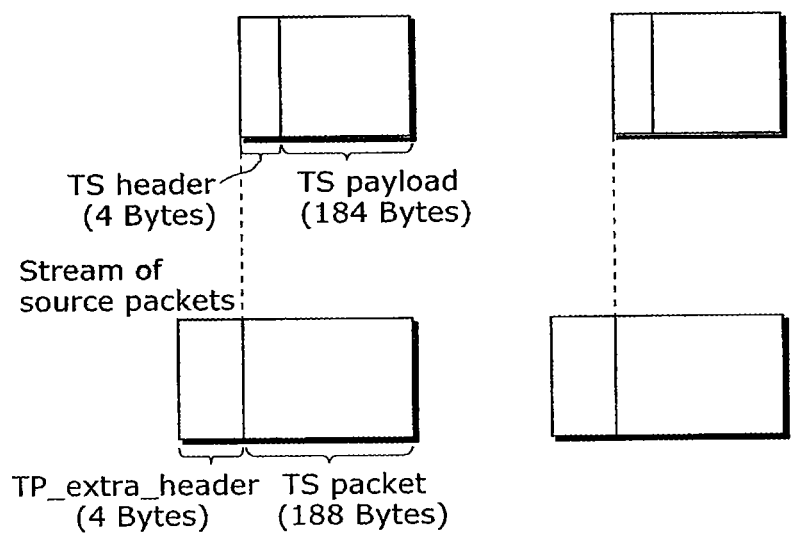
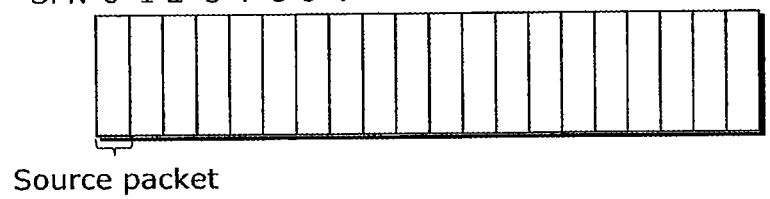

FIG. 34

| Corresponding standard | Driving frequency |
|---|---|
| MPEG-4 AVC | 500 MHz |
| MPEG-2 | 350 MHz |
| ⋮ | ⋮ | ex900 ex1000

IMAGE CODING METHOD, IMAGE CODING APPARATUS, IMAGE DECODING METHOD AND IMAGE DECODING APPARATUS

CROSS REFERENCE TO RELATED APPLICATION

This application is a continuation of co-pending U.S. application Ser. No. 13/669,690, filed Nov. 6, 2012, which is claims the benefit of U.S. Provisional Patent Application No. 61/556,406 filed on Nov. 7, 2011, the disclosures of which are expressly incorporated herein by reference in its entireties.

FIELD

The present disclosure relates to an image coding technique and an image decoding technique for arithmetic coding or arithmetic decoding.

BACKGROUND

Applications for providing services via the Internet (e.g., video-conference, digital video broadcast, and Video on Demand services including video content streaming) are increasing. These applications rely on transmission of video data. When the applications transmit video data, most video data is transmitted via a conventional transmission path having a limited bandwidth. Furthermore, when the applications record video data, most video data is recorded on a conventional recording medium having a limited capacity. To transmit video data via the conventional transmission path or record video data on the conventional recording medium, it is indispensable to compress or reduce the data amount of the video data.

In view of this, many video coding standards have been developed to compress video data. These video coding standards are, for example, ITU-T standards denoted as H.26x and ISO/IEC standards denoted as MPEG-x. Currently, the latest and most advanced video coding standard is the standard denoted as H.264/MPEG-4 AVC (see Non Patent Literature 1 and Non Patent Literature 2).

The coding approach underlying most of these video coding standards is based on prediction coding that includes the following main steps of (a) to (d): (a) Divide each video frame into blocks each having pixels to compress data of the video frame on a block-by-block basis. (b) Predict each block based on previously coded video data to identify temporal and spatial redundancy. (c) Subtract the predicted data from the video data to remove the identified redundancy. (d) Compress remaining data (residual blocks) by Fourier transform, quantization, and entropy coding.

As for the step (a), the current video coding standard provides different prediction modes depending on a macroblock to be predicted. According to most of the video coding standards, motion estimation and motion compensation are used for predicting video data based on a previously coded and decoded frame (inter frame prediction). Alternatively, block data may be extrapolated from an adjacent block of the same frame (intra frame prediction).

In the step (d), quantized coefficients included in a current block to be coded are scanned in a predetermined order (scan order). Then, information (SignificantFlag) indicating whether the scanned coefficients are zero coefficients or non-zero coefficients (e.g., binary information (symbol) indicating a non-zero coefficient as 1 and a zero coefficient as 0) is coded.

Furthermore, information (last position information) indicating the position of the last non-zero coefficient in the scan order is binarized, arithmetically coded, and arithmetically decoded.

CITATION LIST

Non Patent Literature

[Non Patent Literature 1]
ITU-T Recommendation H.264 "Advanced video coding for generic audiovisual services", March 2010.

[Non Patent Literature 2]
JCT-VC "WD4: Working Draft 4 of High-Efficiency Video Coding", JCTVC-F803, July 2011.

SUMMARY

Technical Problem

However, there is a demand for the conventional technique to achieve more efficient arithmetic coding and arithmetic decoding of the last position information.

In view of this, one non-limiting and exemplary embodiment provides an image coding method which allows efficient arithmetic coding and arithmetic decoding of the last position information.

Solution to Problem

An image coding method according to an aspect of the present disclosure is an image coding method for coding last position information indicating a horizontal position and a vertical position of a last non-zero coefficient in a predetermined order in a current block to be coded, the image coding method including: binarizing a first component and a second component to generate a first binary signal and a second binary signal, respectively, the first component being one of a horizontal component and a vertical component which are included in the last position information, and the second component being the other of the horizontal component and the vertical component; coding a first partial signal and a second partial signal by first arithmetic coding, and coding a third partial signal and a fourth partial signal by second arithmetic coding different from the first arithmetic coding, the first partial signal being a part of the first binary signal, the second partial signal being a part of the second binary signal, the third partial signal being another part of the first binary signal, and the fourth partial signal being another part of the second binary signal; and placing the coded first partial signal, the coded second partial signal, the coded third partial signal, and the coded fourth partial signal in a bit stream, wherein in the placing, (i) the coded second partial signal is placed next to the coded first partial signal, or (ii) the coded fourth partial signal is placed next to the coded third partial signal.

It is to be noted that this general aspect may be implemented using a system, an apparatus, an integrated circuit, a computer program, or a computer-readable recording medium such as a CD-ROM, or any combination of systems, apparatuses, integrated circuits, computer programs, or computer-readable recording media.

Advantageous Effects

With the image coding method according to an aspect of the present disclosure, it is possible to arithmetically code and arithmetically decode the last position information efficiently.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 1 is a block diagram showing an example of a configuration of an image decoding apparatus according to the underlying knowledge.

FIG. 2 is a flowchart showing an example of an image decoding method according to the underlying knowledge.

[FIG. 3A]

FIG. 3A is a diagram showing an example of binary signals of last position information when the block size is 4×4.

[FIG. 3B]

FIG. 3B is a diagram showing an example of binary signals of last position information when the block size is 8×8.

[FIG. 3C]

FIG. 3C is a diagram showing an example of binary signals of last position information when the block size is 16×16.

[FIG. 3D]

FIG. 3D is a diagram showing an example of binary signals of last position information when the block size is 32×32.

FIG. 4 is a flowchart showing context adaptive binary arithmetic decoding.

FIG. 5 is a flowchart showing bypass decoding.

FIG. 6 is a flowchart showing normalization.

FIG. 7 is a block diagram showing a functional configuration of an image decoding apparatus according to Embodiment 1.

FIG. 8A is a flowchart showing an example of processing operations of an image decoding apparatus according to Embodiment 1.

FIG. 8B is a flowchart showing another example of processing operations of an image decoding apparatus according to Embodiment 1.

[FIG. 9A]

FIG. 9A is a flowchart showing an example of processing operations of a second decoding unit according to Embodiment 1.

[FIG. 9B]

FIG. 9B is a diagram showing an example of a relationship between the block size and the maximum length of a prefix part according to Embodiment 1.

[FIG. 9C]

FIG. 9C is a diagram showing another example of a relationship between the block size and the maximum length of a prefix part according to Embodiment 1.

[FIG. 9D]

FIG. 9D is a diagram showing an example of a relationship between the block size and the rice parameter according to Embodiment 1.

[FIG. 9E]

FIG. 9E is a diagram showing another example of a relationship between the block size and the rice parameter according to Embodiment 1.

[FIG. 10A]

FIG. 10A is a flowchart showing an example of a method of determining an RP value and a maximum length of a prefix part.

[FIG. 10B]

FIG. 10B is a flowchart showing another example of a method of determining an RP value and a maximum length of a prefix part.

FIG. 10C is a flowchart showing another example of a method of determining an RP value and a maximum length of a prefix part.

FIG. 10D is a flowchart showing another example of a method of determining an RP value and a maximum length of a prefix part.

FIG. 11A is a diagram for describing an example of arithmetic decoding according to Embodiment 1.

FIG. 11B is a diagram for describing an example of arithmetic decoding according to a comparable example.

FIG. 12 is a block diagram showing an example of a configuration of an image decoding apparatus according to a variation of Embodiment 1.

FIG. 13 is a block diagram showing a functional configuration of an image coding apparatus according to Embodiment 2.

FIG. 14A is a flowchart showing an example of processing operations of an image coding apparatus according to Embodiment 2.

FIG. 14B is a flowchart showing another example of processing operations of an image coding apparatus according to Embodiment 2.

[FIG. 15]

FIG. 15 is a diagram showing an example of binary signals of last position information when the block size is 16×16.

FIG. 16 is a block diagram showing an example of a configuration of an image coding apparatus according to Embodiment 2.

FIG. 17 shows an overall configuration of a content providing system for implementing content distribution services.

FIG. 18 shows an overall configuration of a digital broadcasting system.

FIG. 19 shows a block diagram illustrating an example of a configuration of a television.

FIG. 20 shows a block diagram illustrating an example of a configuration of an information reproducing/recording unit that reads and writes information from and on a recording medium that is an optical disk.

FIG. 21 shows an example of a configuration of a recording medium that is an optical disk.

FIG. 22A shows an example of a cellular phone.

FIG. 22B is a block diagram showing an example of a configuration of a cellular phone.

FIG. 23 illustrates a structure of multiplexed data.

FIG. 24 schematically shows how each stream is multiplexed in multiplexed data.

FIG. 25 shows how a video stream is stored in a stream of PES packets in more detail.

[FIG. 26]

FIG. 26 shows a structure of TS packets and source packets in the multiplexed data.

FIG. 27 shows a data structure of a PMT.

FIG. 28 shows an internal structure of multiplexed data information.

FIG. 29 shows an internal structure of stream attribute information.

FIG. 30 shows steps for identifying video data.

FIG. 31 shows an example of a configuration of an integrated circuit for implementing the moving picture coding method and the moving picture decoding method according to each of embodiments.

FIG. 32 shows a configuration for switching between driving frequencies.

FIG. 33 shows steps for identifying video data and switching between driving frequencies.

[FIG. 34]

FIG. 34 shows an example of a look-up table in which video data standards are associated with driving frequencies.

FIG. 35A is a diagram showing an example of a configuration for sharing a module of a signal processing unit.

FIG. 35B is a diagram showing another example of a configuration for sharing a module of the signal processing unit.

DESCRIPTION OF EMBODIMENTS (Underlying Knowledge Forming Basis of the Present Disclosure)

The inventors have found the following matter regarding the arithmetic coding and arithmetic decoding of the last position information described in the "Background" section.

It is to be noted that in the following description, the last position information indicates a horizontal position and a vertical position of the last non-zero coefficient in a predetermined order in a current block. Here, the last position information includes a horizontal component (hereinafter referred to as "X component") and a vertical component (hereinafter referred to as "Y component"). The X component indicates a horizontal position in the current block. The Y component indicates a vertical position in the current block.

Figure 1:
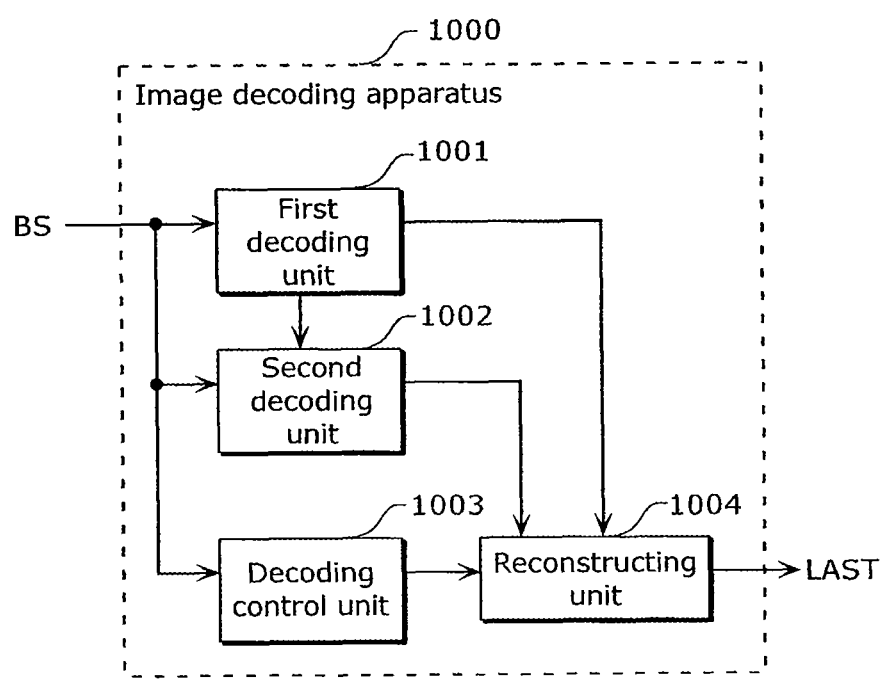
[FIG. 1]
Figure 2:
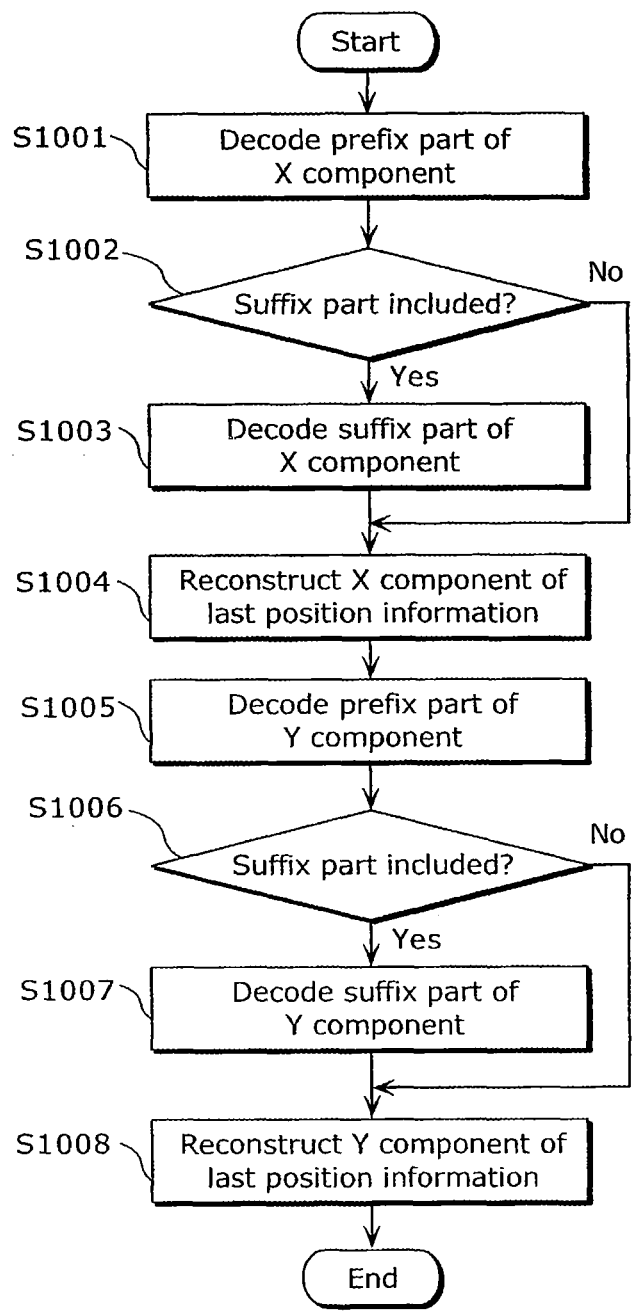
[FIG. 2]

FIG. 1 is a block diagram showing an example of a configuration of an image decoding apparatus 1000 according to the underlying knowledge. FIG. 2 is a flowchart showing an example of an image decoding method according to the underlying knowledge. As shown in FIG. 1, the image decoding apparatus 1000 includes a first decoding unit 1001, a second decoding unit 1002, a decoding control unit 1003, and a reconstructing unit 1004.

The image decoding apparatus 1000 obtains a bit stream BS which includes the last position information. Then, the image decoding apparatus 1000 inputs the bit stream BS to the first decoding unit 1001, the second decoding unit 1002, and the decoding control unit 1003.

The decoding control unit 1003 manages whether each signal in the obtained bit stream BS is the X component or the Y component of the last position information.

The first decoding unit 1001 arithmetically decodes a prefix part of the X component of the last position information included in the bit stream BS (S1001). More specifically, the first decoding unit 1001 decodes the prefix part of the X component by context adaptive binary arithmetic decoding. Here, the prefix part is a part of a binary signal of the X component or the Y component, which is coded by context adaptive binary arithmetic coding.

Next, the first decoding unit 1001 determines whether or not the binary signal of the X component includes a suffix part (S1002). The suffix part is a part of the binary signal of the X component or the Y component, which is coded by bypass coding.

The prefix part and the suffix part are determined according to each value (hereinafter referred also to as "last value") of the X component and the Y component as shown in FIG. 3A to FIG. 3D, for example. Thus, with a predetermined method, the first decoding unit 1001 can determine whether or not the binary signal of the X component includes the suffix part.

More specifically, when the size of a transform block (hereinafter referred to as "transform size") is 4×4, for example, the binary signal of the X component includes the prefix part only and does not include the suffix part regardless of the last value as shown in FIG. 3A. Thus, the first decoding unit 1001 determines that the binary signal of the X component does not include the suffix part when the size of a block to be decoded is 4×4.

In the case where the transform size is 8×8, for example, the first decoding unit 1001 determines that the decoded binary signal of the X component does not include the suffix part when any of binary symbol values up to the binary symbol value of the 4th bit of the binary signal of the X component is "1" as shown in FIG. 3B. On the other hand, the first decoding unit 1001 determines that the decoded binary signal of the X component includes a suffix part having a fixed length of 2 bits when the binary symbol values up to the binary symbol value of the 4th bit of the binary signal of the X component are all "0".

In the case where the transform size is 16×16, for example, the first decoding unit 1001 determines that the decoded binary signal of the X component does not include the suffix part when any of the binary symbol values up to the binary symbol value of the 8th bit of the binary signal of the X component is "1" as shown in FIG. 3C. On the other hand, the first decoding unit 1001 determines that the decoded binary signal of the X component includes a suffix part having a fixed length of 3 bits when the binary symbol values up to the binary symbol value of the 8th bit of the binary signal of the X component are all "0".

In the case where the transform size is 32×32, for example, the first decoding unit 1001 determines that the decoded binary signal of the X component does not include the suffix part when any of binary symbol values up to the binary symbol value of the 16th bit of the binary signal of the X component is "1" as shown in FIG. 3D. On the other hand, the first decoding unit 1001 determines that the decoded binary signal of the X component includes a suffix part having a fixed length of 4 bits when the binary symbol values up to the binary symbol value of the 16th bit of the binary signal of the X component are all "0".

Here, when the binary signal of the X component includes the suffix part (Yes in S1002), the second decoding unit 1002 arithmetically decodes the suffix part having a predetermined, fixed bit length (S1003). More specifically, the second decoding unit 1002 arithmetically decodes the suffix part of the X component by bypass decoding. On the other hand, when the binary signal of the X component does not include the suffix part (No in S1002), the decoding process for the suffix part is skipped.

The reconstructing unit 1004 reconstructs the X component of the last position information using the prefix part and the suffix part which have been decoded (S1004). More specifically, when the binary signal of the X component includes the suffix part, the reconstructing unit 1004 reconstructs the X component by debinarizing the binary signal including the decoded prefix part and suffix part. On the other hand, when the binary signal of the X component does not include the suffix part, the reconstructing unit 1004 reconstructs the X component by debinarizing the binary signal including the decoded prefix part.

Next, the first decoding unit 1001 arithmetically decodes the prefix part of the Y component of the last position information as in Step S1001 (S1005). After that, the first decoding unit 1001 determines whether or not the binary signal of the Y component includes the suffix part as in Step S1002 (S1006).

Here, when the binary signal of the Y component includes the suffix part (Yes in S1006), the second decoding unit 1002 arithmetically decodes the suffix part having a predetermined fixed length as in Step S1003 (S1007). On the other hand, when the binary signal of the Y component does not include the suffix part (No in S1006), the decoding process for the suffix part is skipped.

Lastly, the reconstructing unit 1004 reconstructs the Y component of the last position information as in Step S1004 (S1008). More specifically, when the binary signal of the Y component includes the suffix part, the reconstructing unit 1004 reconstructs the Y component by debinarizing the binary signal including the decoded prefix part and suffix part. On the other hand, when the binary signal of the Y component does not include the suffix part, the reconstructing unit 1004 reconstructs the Y component by debinarizing the binary signal including the decoded prefix part.

This is the manner in which the X component and the Y component included in the last position information are reconstructed.

Next, variable-length coding and variable-length decoding will be described. H.264 employs context adaptive binary arithmetic coding (CABAC) as one of variable-length coding methods. The prefix part is coded by CABAC. In contrast, the suffix part is coded by bypass coding, which is arithmetic coding in which a fixed probability (e.g., "0.5") is used. Hereinafter, context adaptive binary arithmetic decoding and bypass decoding will be described using FIG. 4 to FIG. 6.

Figure 4:
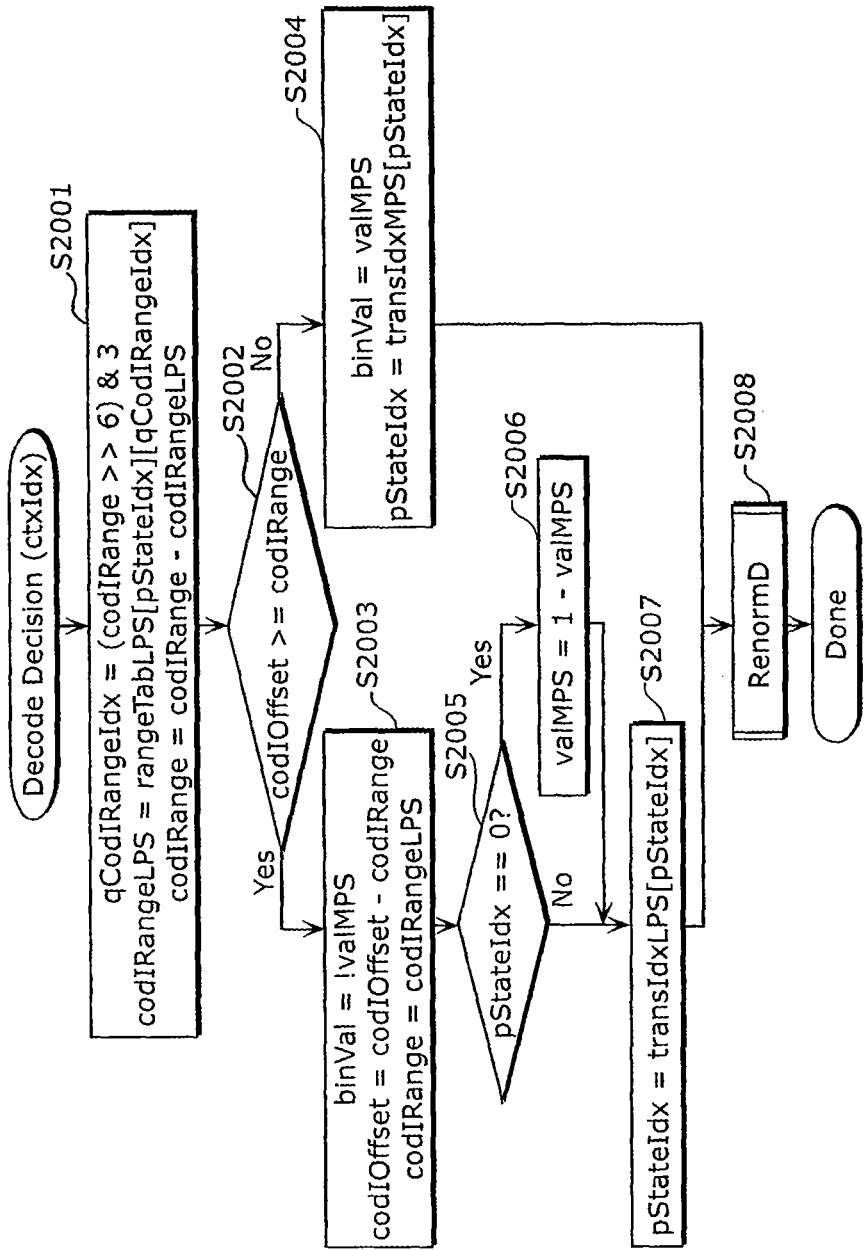
[FIG. 4]

FIG. 4 is a flowchart showing context adaptive binary arithmetic decoding. It is to be noted that FIG. 4 has been excerpted from Non Patent Literature 1. Unless otherwise specified, the description of FIG. 4 is as given in Non Patent Literature 1.

With the arithmetic decoding, first, context (ctxIdx) is inputted which is determined based on the signal type of a current signal to be decoded.

Next, the following process is performed in Step S2001.

First, qCodIRangeIdx is calculated from a first parameter codIRange indicating a current state of arithmetic decoding. Furthermore, pStateIdx is obtained which is a state value corresponding to ctxIdx. Then, codIRangeLPS corresponding to the two values (qCodIRangeIdx and pStateIdx) is obtained by reference to a table (rangeTableLPS).

It is to be noted that codIRangeLPS indicates a state of arithmetic decoding when LPS has occurred in a state of arithmetic decoding indicated by the first parameter codIRange. LPS specifies one of the symbols "0" and "1" which has a lower probability of occurrence.

Furthermore, a value obtained by subtracting the above-mentioned codIRangeLPS from the current codIRange is set to codIRange.

Next, in Step S2002, a comparison is made between codIRange and a second parameter codIOffset which indicates a state of arithmetic decoding.

Here, when codIOffset is greater than or equal to codIRange (Yes in S2002), the following process is performed in Step S2003.

First, it is determined that LPS has occurred, and a value different from valMPS ("0" when valMPS=1, and "1" when valMPS=0) is set to binVal that is a decoding output value. valMPS indicates a specific value of MPS ("0" or "1"). MPS specifies one of the binary symbol values "0" and "1" which has a higher probability of occurrence.

Furthermore, a value obtained by subtracting codIRange from the current codIOffset is set to the second parameter codIOffset that indicates a state of arithmetic decoding. Furthermore, the value of codIRangeLPS which has been set in Step S2001 is set to the first parameter codIRange that indicates a state of arithmetic decoding.

Next, in Step S2005, whether or not the value of pStateIdx is "0" is determined.

Here, when the value of pStateIdx is "0" (Yes in S2005), it means that the probability of LPS is greater than the probability of MPS. Thus, the value of valMPS is switched over (i.e., "0" is set when valMPS=1, and "1" is set when valMPS=0) (Step S2006). On the other hand, when the value of pStateIdx is not "0" (No in S2005), the value of pStateIdx is updated based on a transform table transIdxLPS that is referred to when LPS occurs (Step S2007).

Furthermore, when codIOffset is smaller than codIRange (No in S2002), it is determined that MPS has occurred. Thus, valMPS is set to binVal that is a decoding output value, and the value of pStateIdx is updated based on a transform table transIdxMPS that is referred to when MPS occurs (Step S2004).

Lastly, normalization (RenormD) is performed (Step S2008), and the arithmetic decoding finishes.

As shown above, with the context adaptive binary arithmetic decoding, multiple probabilities of symbol occurrence, which are probabilities of occurrence of binary symbols, are held in association with context indices. The contexts are switched according to a condition (e.g., value of an adjacent block), and thus, it is necessary to maintain the processing order.

Figure 5:
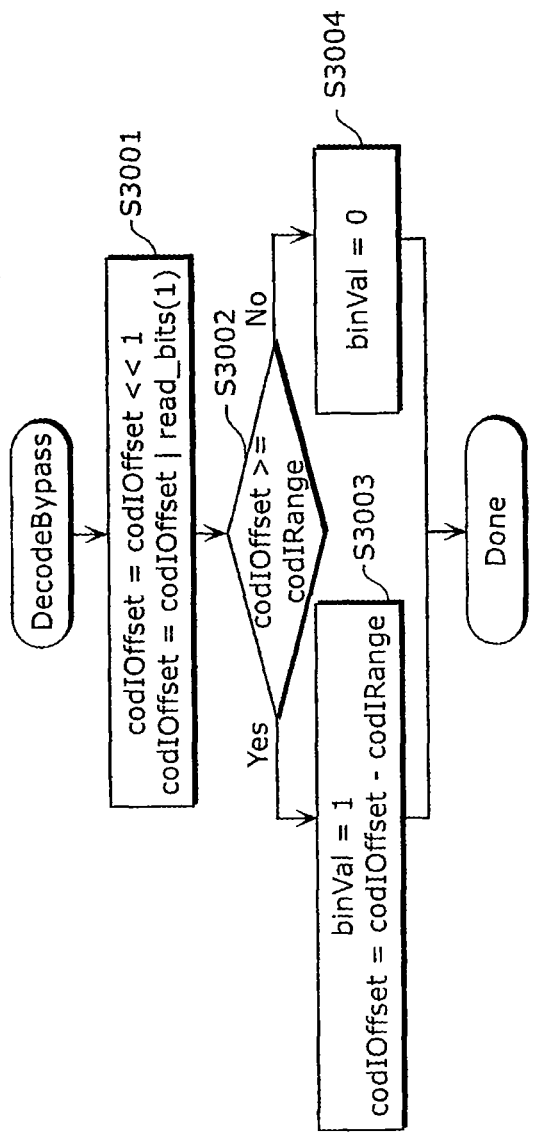
[FIG. 5]

FIG. 5 is a flowchart showing bypass decoding. It is to be noted that FIG. 5 has been excerpted from Non Patent Literature 1. Unless otherwise specified, the description of FIG. 5 is as given in Non Patent Literature 1.

First, the second parameter codIOffset that indicates a current state of arithmetic decoding is left-shifted (doubled).

Furthermore, one bit is read out from the bit stream, and when the read-out bit is "1", 1 is added to codIOffset (Step S3001).

Next, when codIOffset is greater than or equal to the first parameter codIRange that indicates a state of arithmetic decoding (Yes in S3002), "1" is set to binVal that is a decoding output value, and a value obtained by subtracting codIRange from the current codIOffset is set to codIOffset (Step S3003). On the other hand, when codIOffset is smaller than the first parameter codIRange that indicates a state of arithmetic decoding (No in S3002), "0" is set to binVal that is a decoding output value (Step S3004).

Figure 6:
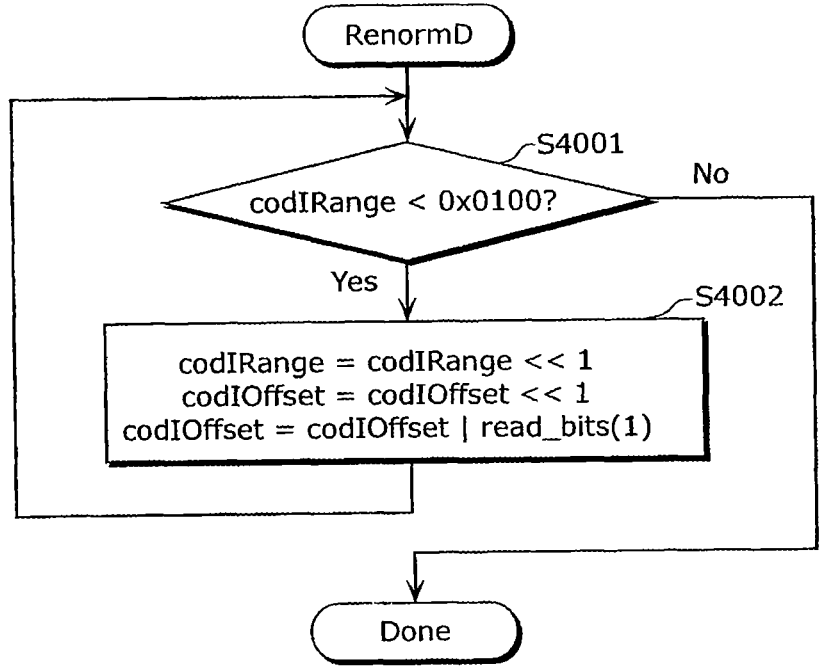
[FIG. 6]

FIG. 6 is a flowchart for describing in detail the normalization (RenormD) shown in Step S2008 in FIG. 4. FIG. 6 has been excerpted from Non Patent Literature 1. Unless otherwise specified, the description of FIG. 6 is as given in Non Patent Literature 1.

When the first parameter codIRange that indicates a state of arithmetic decoding has become smaller than 0x100 (in base 16: 256 (in base 10)) (Yes in S4001), codIRange is left-shifted (doubled). Furthermore, the second parameter codIOffset that indicates a state of arithmetic decoding is left-shifted (doubled). Moreover, one bit is read out from the bit stream, and when the read-out bit is "1", 1 is added to codIOffset (Step S4002).

When codIRange eventually reaches 256 or greater by this process in Step S4002 (No in S4001), the normalization finishes.

This is the manner in which the arithmetic decoding is performed.

However, with the above underlying knowledge, the X component and the Y component included in the last position information are decoded in sequence. That is to say, the X component and the Y component are placed one after the other in the bit stream. Therefore, when the last position information is to be arithmetically decoded, context adaptive binary arithmetic decoding and bypass decoding are alternately performed. This means that switching between the arithmetic decoding methods occurs many times, which hinders efficient arithmetic decoding of the last position information.

In view of the foregoing, an image coding method according to an aspect of the present disclosure is an image coding method for coding last position information indicating a horizontal position and a vertical position of a last non-zero coefficient in a predetermined order in a current block to be coded, the image coding method including: binarizing a first component and a second component to generate a first binary signal and a second binary signal, respectively, the first component being one of a horizontal component and a vertical component which are included in the last position information, and the second component being the other of the horizontal component and the vertical component; coding a first partial signal and a second partial signal by first arithmetic coding, and coding a third partial signal and a fourth partial signal by second arithmetic coding different from the first arithmetic coding, the first partial signal being a part of the first binary signal, the second partial signal being a part of the second binary signal, the third partial signal being another part of the first binary signal, and the fourth partial signal being another part of the second binary signal; and placing the coded first partial signal, the coded second partial signal, the coded third partial signal, and the coded fourth partial signal in a bit stream, wherein in the placing, (i) the coded second partial signal is placed next to the coded first partial signal, or (ii) the coded fourth partial signal is placed next to the coded third partial signal.

With this, in the bit stream, a coded partial signal is followed by a partial signal which has been coded by the same arithmetic coding as the preceding partial signal. Thus, when the arithmetically coded last position information is decoded, it is possible to reduce the number of times the arithmetic decoding methods are switched as compared to the case where the partial signals arithmetically coded by different methods are alternately placed. In other words, it is possible to output a bit stream from which the last position information can be efficiently decoded.

For example, the first arithmetic coding may be context adaptive binary arithmetic coding in which a variable probability updated based on a coded signal is used, and in the placing, the coded second partial signal may be placed next to the coded first partial signal.

With this, context adaptive binary arithmetic coding can be used as the first arithmetic coding. This makes it possible to output a bit stream from which two coded partial signals can be efficiently decoded in series by context adaptive binary arithmetic decoding.

For example, the second arithmetic coding may be bypass coding in which a fixed probability is used, and in the placing, the coded fourth partial signal may be placed next to the coded third partial signal.

With this, bypass coding can be used as the first arithmetic coding. It is to be noted that bypass decoding makes parallel processing easier because the variable probability is not used. This makes it possible to output a bit stream from which two coded partial signals can be efficiently decoded in series or in parallel by bypass decoding.

For example, the first arithmetic coding may be context adaptive binary arithmetic coding in which a variable probability updated based on a coded signal is used, the second arithmetic coding may be bypass coding in which a fixed probability is used, and in the placing, the coded first partial signal, the coded second partial signal, the coded third partial signal, and the coded fourth partial signal may be placed in the bit stream in the following order: the coded first partial signal, the coded second partial signal, the coded third partial signal, and the coded fourth partial signal. With this, two partial signals coded by bypass coding can be placed next to two partial signals coded by context adaptive binary arithmetic coding. This makes it possible to further reduce the number of times the arithmetic decoding methods are switched when the last position information is decoded. In other words, it is possible to output a bit stream from which the last position information can be more efficiently decoded.

For example, the first arithmetic coding may be context adaptive binary arithmetic coding in which a variable probability updated based on a coded signal is used, the second arithmetic coding may be bypass coding in which a fixed probability is used, and in the placing, the coded first partial signal, the coded second partial signal, the coded third partial signal, and the coded fourth partial signal may be placed in the bit stream in the following order: the coded first partial signal, the coded second partial signal, the coded fourth partial signal, and the coded third partial signal.

With this, two partial signals coded by bypass coding can be placed next to two partial signals coded by context adaptive binary arithmetic coding. This makes it possible to further reduce the number of times the arithmetic decoding methods are switched when the last position information is decoded. In other words, it is possible to output a bit stream from which the last position information can be more efficiently decoded.

Furthermore, with this, the coded fourth partial signal is placed next to the coded second partial signal, which makes it possible to output a bit stream from which the second binary signal can be obtained by a series of decoding processes.

For example, the image coding method may further include: switching a coding process to either a first coding process compliant with a first standard or a second coding process compliant with a second standard; and adding, to the bit stream, identification information indicating either the first standard or the second standard with which the coding process switched to is compliant, wherein when the coding process is switched to the first coding process, the binarizing, the coding, and the placing may be performed as the first coding process.

This makes it possible to switch between the first coding process compliant with the first standard and the second coding process compliant with the second standard.

Furthermore, an image decoding method according to an aspect of the present disclosure is an image decoding method for decoding last position information indicating a horizontal position and a vertical position of a last non-zero coefficient in a predetermined order in a current block to be decoded, the image decoding method including: decoding, by first arithmetic decoding, a coded first partial signal and a coded second partial signal which are included in a bit stream, and decoding, by second arithmetic decoding different from the first arithmetic decoding, a coded third partial signal and a coded fourth partial signal which are included in the bit stream; and reconstructing a first component by debinarizing a first binary signal which includes the decoded first partial signal and the decoded third partial signal, and reconstructing a second component by debinarizing a second binary signal which includes the decoded second partial signal and the decoded fourth partial signal, the first component being one of a horizontal component and a vertical component which are included in the last position information, and the second component being the other of the horizontal component and the vertical component, wherein in the bit stream, (i) the coded second partial signal is placed next to the coded first partial signal, or (ii) the coded fourth partial signal is placed next to the coded third partial signal.

With this, the last position information can be reconstructed by decoding of the bit stream in which a coded partial signal is followed by a partial signal which has been coded by the same arithmetic coding as the preceding partial signal. This makes it possible to reduce the number of times the arithmetic decoding methods are switched as compared to the case of decoding a bit stream in which the partial signals arithmetically coded by different methods are alternately placed. In other words, the last position information can be efficiently decoded.

For example, in the bit stream, the coded second partial signal may be placed next to the coded first partial signal, and the first arithmetic decoding may be context adaptive binary arithmetic decoding in which a variable probability updated based on a decoded signal is used.

With this, context adaptive binary arithmetic decoding can be used as the first arithmetic decoding. This makes it possible to efficiently decode two coded partial signals in series by context adaptive binary arithmetic decoding.

For example, in the bit stream, the coded fourth partial signal may be placed next to the coded third partial signal, and the second arithmetic decoding may be bypass decoding in which a fixed probability is used.

With this, bypass decoding can be used as the first arithmetic decoding. It is to be noted that bypass decoding makes parallel processing easier because the variable probability is not used. This makes it possible to efficiently decode two coded partial signals in series or in parallel by bypass decoding.

For example, the coded first partial signal, the coded second partial signal, the coded third partial signal, and the coded fourth partial signal may be placed in the bit stream in the following order: the coded first partial signal, the coded second partial signal, the coded third partial signal, and the coded fourth partial signal, the first arithmetic decoding may be context adaptive binary arithmetic decoding in which a variable probability updated based on a decoded signal is used, and the second arithmetic decoding may be bypass decoding in which a fixed probability is used.

With this, it is possible to decode the bit stream in which two partial signals coded by bypass coding are placed next to two partial signals coded by context adaptive binary arithmetic coding. This makes it possible to further reduce the number of times the arithmetic decoding methods are switched when the last position information is decoded, thereby allowing more efficient decoding of the last position information.

For example, the coded first partial signal, the coded second partial signal, the coded third partial signal, and the coded fourth partial signal may be placed in the bit stream in the following order: the coded first partial signal, the coded second partial signal, the coded fourth partial signal, and the coded third partial signal, the first arithmetic decoding may be context adaptive binary arithmetic decoding in which a variable probability updated based on a decoded signal is used, and the second arithmetic decoding may be bypass decoding in which a fixed probability is used.

With this, it is possible to decode the bit stream in which two partial signals coded by bypass coding are placed next to two partial signals coded by context adaptive binary arithmetic coding. This makes it possible to further reduce the number of times the arithmetic decoding methods are switched when the last position information is decoded, thereby allowing more efficient decoding of the last position information.

Furthermore, with this, the bit stream is coded in which the coded fourth partial signal is placed next to the coded second partial signal, thereby allowing the second binary signal to be obtained by a series of decoding processes.

For example, the image decoding method may further include switching a decoding process to either a first decoding process compliant with a first standard or a second decoding process compliant with a second standard, according to identification information which is added to the bit stream and indicates either the first standard or the second standard, wherein when the decoding process is switched to the first decoding process, the decoding and the reconstructing may be performed as the first decoding process.

This makes it possible to switch between the first decoding process compliant with the first standard and the second decoding process compliant with the second standard.

It is to be noted that these general and specific aspects may be implemented using a system, an apparatus, an integrated circuit, a computer program, or a computer-readable recording medium such as a CD-ROM, or any combination of systems, apparatuses, integrated circuits, computer programs, or computer-readable recording media.

Hereinafter, embodiments will be described in detail using the drawings.

It is to be noted that each of the embodiments described below shows a general or specific example. The numerical values, shapes, materials, structural elements, the arrangement and connection of the structural elements, steps, the processing order of the steps etc., shown in the following embodiments are mere examples, and are therefore not intended to limit the scope of the Claims. Furthermore, among the structural elements in the following embodiments, structural elements not recited in any one of the independent claims representing the most generic concepts are described as arbitrary structural elements.

(Embodiment 1)

Figure 7:
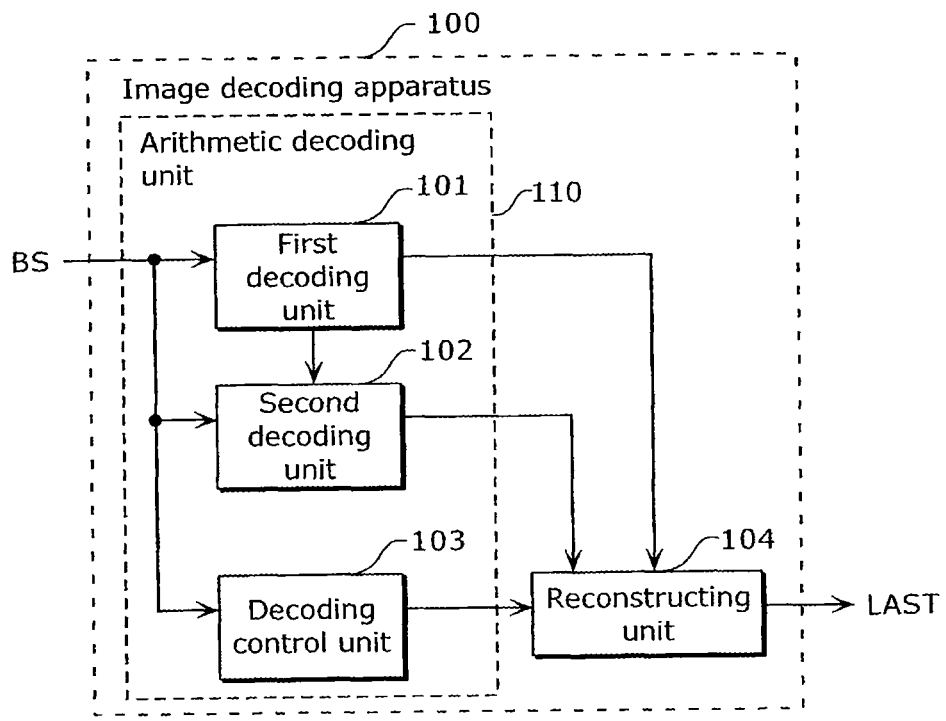
[FIG. 7]

FIG. 7 is a block diagram showing a functional configuration of an image decoding apparatus 100 according to Embodiment 1. The image decoding apparatus 100 decodes the last position information. Described here is the case where the coded last position information includes a coded first partial signal, a coded second partial signal, a coded third partial signal, and a coded fourth partial signal.

As shown in FIG. 7, the image decoding apparatus 100 includes an arithmetic decoding unit 110 and a reconstructing unit 104. The arithmetic decoding unit 110 includes a first decoding unit 101, a second decoding unit 102, and a decoding control unit 103.

The image decoding apparatus 100 obtains a bit stream BS which includes the coded last position information.

It is to be noted that in some cases the bit stream BS does not include the coded third partial signal or does not include the coded fourth partial signal. For example, the bit stream BS does not include the coded third partial signal or does not include the coded fourth partial signal when a block to be decoded is smaller than a predetermined size, or when the value (last value) of a first component or a second component included in the last position information is smaller than a predetermined value.

Each of the coded first partial signal and the coded second partial signal corresponds to a prefix part which has been coded by context adaptive binary arithmetic coding, for example. Each of the coded third partial signal and the coded fourth partial signal corresponds to a suffix part which has been coded by bypass coding, for example.

Here, in the bit stream BS, the coded second partial signal is placed next to the coded first partial signal, or, the coded fourth partial signal is placed next to the coded third partial signal.

More specifically, in the bit stream BS, the coded first partial signal, the coded second partial signal, the coded third partial signal, and the coded fourth partial signal are placed in the following order: the coded first partial signal, the coded second partial signal, the coded third partial signal, and the coded fourth partial signal, for example. Furthermore, in the bit stream BS, the coded first partial signal, the coded second partial signal, the coded third partial signal, and the coded fourth partial signal may be placed in the following order: the coded first partial signal, the coded second partial signal, the coded fourth partial signal, and the coded third partial signal, for example.

The first decoding unit 101 decodes the coded first partial signal and the coded second partial signal by first arithmetic decoding. The first arithmetic decoding is context adaptive binary arithmetic decoding in which a variable probability updated based on a decoded signal is used, for example. In this case, the first decoding unit 101 decodes the coded first partial signal and the coded second partial signal by context adaptive binary arithmetic decoding. It is to be noted that the first arithmetic decoding need not be context adaptive binary arithmetic decoding.

The second decoding unit 102 decodes the coded third partial signal and the coded fourth partial signal by second arithmetic decoding. For example, the second arithmetic decoding is bypass decoding in which a fixed probability is used. In this case, the second decoding unit 102 decodes the coded third partial signal and the coded fourth partial signal by bypass decoding. In doing so, the second decoding unit 102 may decode the coded third partial signal and the coded fourth partial signal in parallel.

It is to be noted that the second arithmetic decoding need not be bypass decoding. More specifically, it is sufficient as long as the first arithmetic decoding and the second arithmetic decoding are different.

The decoding control unit 103 manages, for each part of the bit stream BS, whether the part is the X component or the Y component of the last position information. It is to be noted that the decoding control unit 103 need not be included in the arithmetic decoding unit 110. That is to say, the image decoding apparatus 100 need not include the decoding control unit 103. In this case, it is sufficient as long as the first decoding unit 101 and the second decoding unit 102 manage the X component and the Y component.

The reconstructing unit 104 reconstructs the first component that is one of the horizontal component and the vertical component included in the last position information, by debinarizing a first binary signal which includes the first partial signal and the third partial signal. Furthermore, the reconstructing unit 104 reconstructs the second component that is the other of the horizontal component and the vertical component included in the last position information, by debinarizing a second binary signal which includes the second partial signal and the fourth partial signal.

Figure 8A:
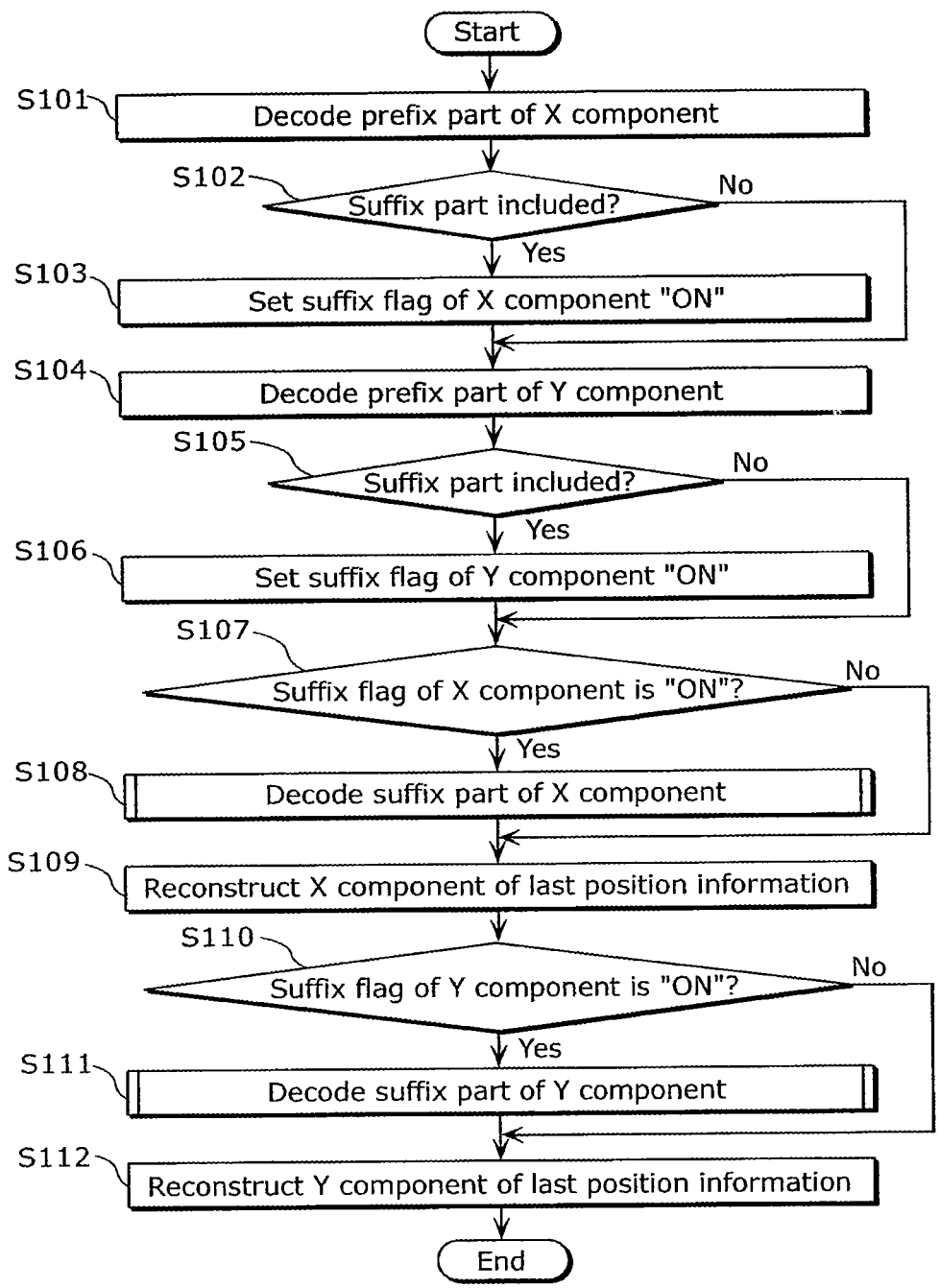
[FIG. 8A]
Figure 8B:
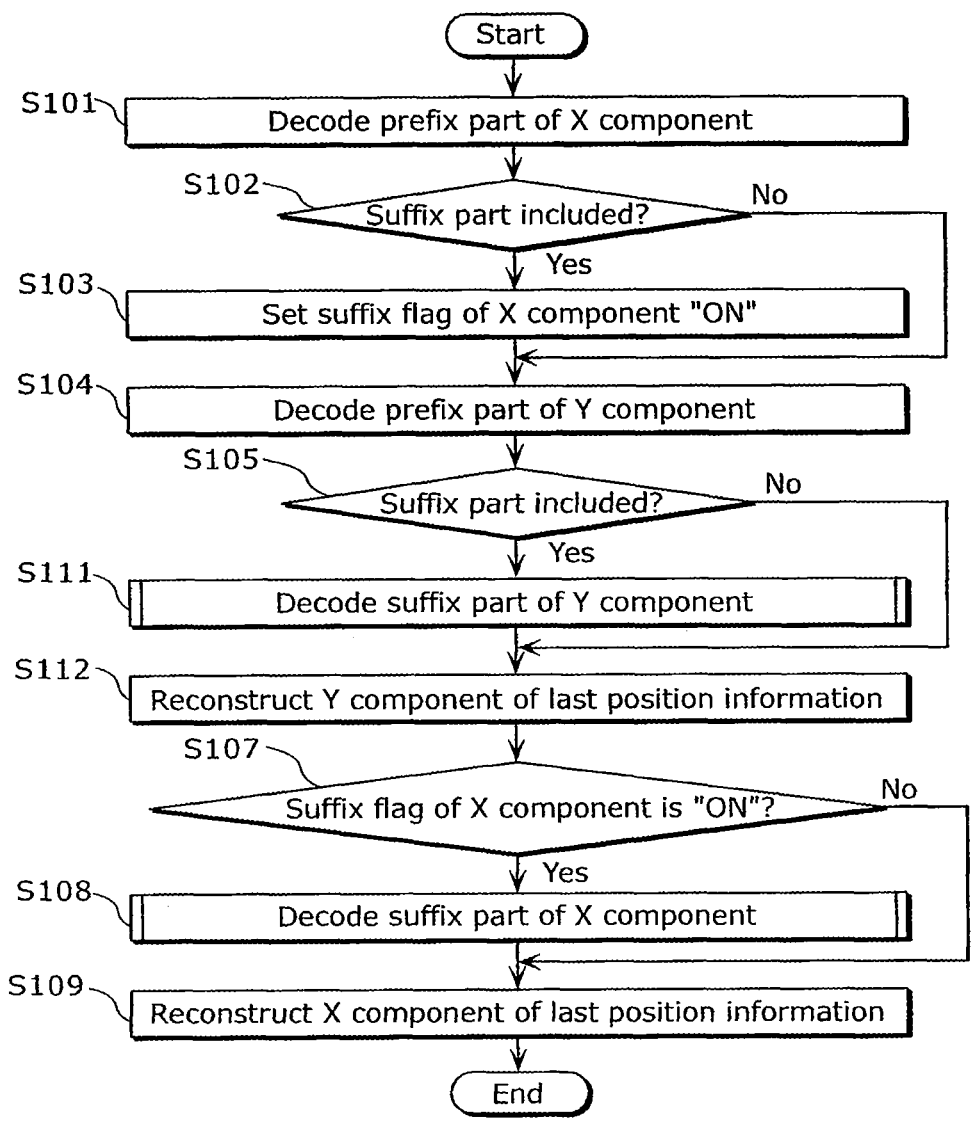
[FIG. 8B]

Next, using FIG. 8A and FIG. 8B, the following describes in detail operations of the image decoding apparatus 100 having the above configuration.

Hereinafter, it is assumed that the first component is the X component and the second component is the Y component. It is also assumed that each of the first partial signal and the second partial signal is the prefix part and each of the third partial signal and the fourth partial signal is the suffix part. Furthermore, it is assumed that the suffix flag of the X component and the suffix flag of the Y component are set "OFF" as the default value. It is to be noted that the suffix flag is an internal flag indicating whether or not the binary signal of its corresponding component of the last position information includes the suffix part.

FIG. 8A is a flowchart showing an example of processing operations of the image decoding apparatus 100 according to Embodiment 1. As for FIG. 8A, the coded prefix part of the X component, the coded prefix part of the Y component, the coded suffix part of the X component, and the coded suffix part of the Y component are consecutively placed in the bit stream BS in the following order: the coded prefix part of the X component, the coded prefix part of the Y component, the coded suffix part of the X component, and the coded suffix part of the Y component. It is to be noted that in some cases the suffix part of each component is not included in the bit stream BS depending on the value of the component.

First, the first decoding unit 101 decodes, from the bit stream BS, the coded prefix part of the X component by context adaptive binary arithmetic decoding (S101). For example, the first decoding unit 101 arithmetically decodes the coded prefix part on a one bit-by-one bit basis until a predetermined maximum length is reached or until "1" is decoded.

Next, the first decoding unit 101 determines whether or not the binary signal of the X component includes the suffix part (S102).

For example, the first decoding unit 101 determines that the binary signal of the X component includes the suffix part when the prefix part has the predetermined maximum length and the binary symbol values included in the prefix part are all "0".

It is to be noted that the maximum length of the prefix part is predetermined according to the transform size, for example. For example, the maximum length of the prefix part is determined in the manner shown in FIG. 9B or FIG. 9C.

Here, when the binary signal of the X component includes the suffix part (Yes in S102), the first decoding unit 101 sets the suffix flag of the X component "ON" (S103). On the other hand, when the binary signal of the X component does not include the suffix part (No in S102), the first decoding unit 101 does not set the suffix flag of the X component "ON". In other words, the suffix flag of the X component remains "OFF", which is the default value. It is to be noted that the first decoding unit 101 may set the suffix flag of the X component "OFF" here.

Next, the first decoding unit 101 decodes, by context adaptive binary arithmetic decoding, the coded prefix part of the Y component placed next to the coded prefix part of the X component (S104). More specifically, the first decoding unit 101 decodes the prefix part of the Y component in the same manner as the decoding of the prefix part of the X component.

After that, the first decoding unit 101 determines whether or not the binary signal of the Y component includes the suffix part (S105). More specifically, the first decoding unit 101 determines whether or not the binary signal of the Y component includes the suffix part in the same manner as the determination as to whether or not the binary signal of the X component includes the suffix part.

Here, when the binary signal of the Y component includes the suffix part (Yes in S105), the first decoding unit 101 sets the suffix flag of the Y component "ON" (S106). On the other hand, when the binary signal of the Y component does not include the suffix part (No in S105), the first decoding unit 101 does not set the suffix flag of the Y component "ON".

Next, the second decoding unit 102 determines whether or not the suffix flag of the X component is set "ON" (S107). Here, when the suffix flag of the X component is set "ON" (Yes in S107), the second decoding unit 102 decodes, by bypass decoding, the coded suffix part of the X component placed next to the coded prefix part of the Y component (S108). On the other hand, when the suffix flag of the X component is not set "ON" (No in S107), Step S108 is skipped.

The reconstructing unit 104 reconstructs the X component of the last position information by debinarizing the binary signal of the X component which includes both the prefix part and the suffix part or which includes the prefix part only (S109). For example, when the value of the X component is binarized as shown in FIG. 3B, the reconstructing unit 104 reconstructs the X component value "5" by debinarizing the binary signal "000010".

Next, the second decoding unit 102 determines whether or not the suffix flag of the Y component is set "ON" (S110). Here, when the suffix flag of the Y component is set "ON" (Yes in S110), the second decoding unit 102 decodes, by bypass decoding, the coded suffix part of the Y component placed next to the coded suffix part of the X component or placed next to the coded prefix part of the Y component (S111). On the other hand, when the suffix flag of the Y component is not set "ON" (No in S110), Step S111 is skipped.

Lastly, the reconstructing unit 104 reconstructs the Y component of the last position information by debinarizing the binary signal of the Y component which includes both the prefix part and the suffix part or which includes the prefix part only (S112).

It is to be noted that although the second decoding unit 102 in FIG. 8A decodes the suffix part of the Y component (S111) after decoding the suffix part of the X component (S108), the second decoding unit 102 may decode the suffix part of the X component and the suffix part of the Y component in parallel. This allows the second decoding unit 102 to arithmetically decode the last position information at a higher speed.

Next, the following describes the case where the prefix part and the suffix part of each component are placed in the bit stream in an order different from that in FIG. 8A.

FIG. 8B is a flowchart showing another example of processing operations of the image decoding apparatus 100 according to Embodiment 1. It is to be noted that in FIG. 8B, the processes performed in steps denoted by the same reference signs as those in FIG. 8A are basically the same as the processes described in FIG. 8A.

As for FIG. 8B, the coded prefix part of the X component, the coded prefix part of the Y component, the coded suffix part of the X component, and the coded suffix part of the Y component are consecutively placed in the bit stream BS in the following order: the coded prefix part of the X component, the coded prefix part of the Y component, the coded suffix part of the Y component, and the coded suffix part of the X component. It is to be noted that in some cases the suffix part of each component is not included in the bit stream BS depending on the value of the component, as in the case of FIG. 8A.

First, the first decoding unit 101 decodes the coded prefix part of the X component by context adaptive binary arithmetic decoding (S101). Then, the first decoding unit 101 determines whether or not the binary signal of the X component includes the suffix part (S102).

Here, when the binary signal of the X component includes the suffix part (Yes in S102), the first decoding unit 101 sets the suffix flag of the X component "ON" (S103). On the other hand, when the binary signal of the X component does not include the suffix part (No in S102), the first decoding unit 101 does not set the suffix flag of the X component "ON".

Next, the first decoding unit 101 decodes, by context adaptive binary arithmetic decoding, the coded prefix part of the Y component placed next to the coded prefix part of the X component (S104). Then, the first decoding unit 101 determines whether or not the binary signal of the Y component includes the suffix part (S105).

Here, when the binary signal of the Y component includes the suffix part (Yes in S105), the second decoding unit 102 decodes, by bypass decoding, the coded suffix part of the Y component placed next to the coded prefix part of the Y component (S111). On the other hand, when the binary signal of the Y component does not include the suffix part (No in S105), Step S111 is skipped.

Next, the reconstructing unit 104 reconstructs the Y component of the last position information by debinarizing the binary signal of the Y component which includes both the prefix part and the suffix part or which includes the prefix part only (S112).

After that, the second decoding unit 102 determines whether or not the suffix flag of the X component is set "ON" (S107). Here, when the suffix flag of the X component is set "ON" (Yes in S107), the second decoding unit 102 decodes, by bypass decoding, the coded suffix part of the X component placed next to the coded prefix part or suffix part of the Y component (S108). On the other hand, when the suffix flag of the X component is not set "ON" (No in S107), Step S108 is skipped.

Lastly, the reconstructing unit 104 reconstructs the X component of the last position information by debinarizing the binary signal of the X component which includes both the prefix part and the suffix part or which includes the prefix part only (S109).

By consecutively decoding the prefix part and the suffix part of the Y component in the above-described manner, it is possible to reconstruct the Y component without holding, in a memory, information indicating whether or not the binary signal of the Y component includes the suffix part (here, the suffix flag of the Y component). This reduces the capacity required of the memory.

It is to be noted that in the flowcharts shown in FIG. 8A and FIG. 8B, it is not necessary to perform the determination regarding the suffix parts (S102 and S105), the setting of the suffix flags (S103 and S106), nor the determination regarding the suffix flags (S107 and S110) when it is determined in advance based on information included in the bit stream, for example, that the binary signals of the X component and the Y component each include the suffix part.

Next, the following describes an example of the decoding process on the coded suffix parts of the X component and the Y component (S108 and S111). Described here is the case where the suffix parts are binarized by Golomb-Rice coding.

With the Golomb-Rice coding, the length of each suffix part is not fixed. The suffix part can be divided into two parts, the first half and the second half.

The second half is a fixed-length part having a length indicated by a rice parameter (hereinafter referred to as "RP").

The first half can be represented by: "1" that increases in the unit of a number representable by 2 to the RPth power ($2^{RP}$) (e.g., in the unit of "4" when RP is "2"); and "0" that is set at the last bit position. More specifically, when RP is "2", the length of the first half increases by 1 bit for each unit of 2 to the RPth power as follows: 0, 0, 0, 0, 10, 10, 10, 10, 110, 110, 110, 110, . . . .

It is to be noted that here, the amount of information to be represented by the suffix part is known, and thus it is possible to omit the last "0" of the first half when the first half has the maximum length. For example, when RP is "2" and the maximum amount of information is "12", the first half can be represented by any one of 0, 0, 0, 0, 10, 10, 10, 10, 11, 11, 11, and 11. By omitting the last "0" of the first half in this manner, the coding amount of the binary signal can be reduced by 1 bit.

The maximum amount of information can be represented by the difference between the length in the transform size and the length of the prefix part. This reduces redundant bit(s).

It is sufficient as long as RP is predetermined according to the transform size as shown in FIG. 9D or FIG. 9E, for example. This makes it possible to represent the suffix part with a binary signal having a length adapted to the transform size, and thus, the coding efficiency can be increased.

The following describes, using FIG. 9A, operations of the second decoding unit 102 for decoding the suffix part binarized by Golomb-Rice coding as described above. FIG. 9A is a flowchart showing an example of processing operations of the second decoding unit 102 according to Embodiment 1.

First, the second decoding unit 102 sets an RP value (S201). More specifically, the second decoding unit 102 refers to a predetermined table, for example, to set the RP value. The predetermined table in this case is a table shown in FIG. 9D or FIG. 9E, for example.

It is to be noted that the second decoding unit 102 may set the RP value without referring to the table. The setting of the RP value will be described later in detail using FIG. 10A to FIG. 10D.

Next, the second decoding unit 102 sets a Max value (S202). Here, the Max value indicates the maximum value of the length of the first half of the Golomb-Rice code. More specifically, the Max value indicates the shortest length of the binary signal that can represent a value obtained by subtracting the maximum length of the prefix part from the maximum value of the last value. Thus, the second decoding unit 102 derives the Max value by (i) subtracting the length of the prefix part from the maximum value of the last value and (ii) dividing the resultant value by 2 to the RPth power or performing a right shift operation on the resultant value by RP bit(s).

It is to be noted that the maximum length of the prefix part may be varied according to the transform size as shown in FIG. 9B or FIG. 9C.

Next, the second decoding unit 102 decodes, from the bit stream BS, a signal corresponding to 1 bit of the Golomb-Rice code by bypass decoding, and increments the count value (default is "0") by 1 (S203).

Here, when the decoded signal corresponding to 1 bit is "0" (Yes in S204), the decoding of the first half of the Golomb-Rice code finishes, and the process proceeds to Step S206.

On the other hand, when the decoded signal is not "0" (when the decoded signal is "1") (No in S204), it is determined whether or not the count value is equal to the Max value (S205). Here, when the count value is not equal to the Max value (No in S205), the process returns to Step S203. More specifically, the second decoding unit 102 decodes a signal corresponding to the next 1 bit of the Golomb-Rice code by bypass decoding.

On the other hand, when the count value is equal to the Max value (Yes in S205), the decoding of the first half of the suffix part finishes, and the process proceeds to Step S206.

Next, the second decoding unit 102 decodes the second half of the Golomb-Rice code (a binary signal having a fixed length of RP bit(s)) by bypass decoding (S206).

Lastly, the second decoding unit 102 reconstructs the value represented by Golomb-Rice coding (S207). Here, the value is reconstructed by adding up the second half of the Golomb-Rice code and a value obtained by shifting, to the left by the RP bit(s), a value obtained by subtracting 1 from the value represented by the first half of the Golomb-Rice code.

It is to be noted that in some cases the value of the binary signal of the second half is binarized in the form of a reversed value. In such cases, the second decoding unit 102 performs the reconstruction with this reverse taken into account. It is to be noted that it is sufficient as long as the decoding apparatus and the coding apparatus determine in advance whether or not the value of the binary signal is to be reversed. Neither the coding efficiency nor the processing load is affected regardless of whether or not the value of the binary signal is reversed.

Next, the following describes, using FIG. 10A to FIG. 10D, a method of determining the RP value and the maximum length of the prefix part.

FIG. 10A shows a method of determining the RP value and the maximum length of the prefix part according to the transform size.

First, the second decoding unit 102 obtains the transform size (S301). Then, the second decoding unit 102 refers to a table as shown in FIG. 9D or FIG. 9E indicating a relationship between the transform size and the RP value, to determine the RP value associated with the obtained transform size (S302).

Furthermore, the second decoding unit 102 refers to a table as shown in FIG. 9B or FIG. 9C indicating a relationship between the transform size and the maximum length of the prefix part, to determine the maximum length of the prefix part (S303).

FIG. 10B shows a method of determining the RP value and the maximum length of the prefix part according to prediction information.

First, the second decoding unit 102 obtains prediction information (S311). The prediction information is information related to prediction of a transform block which is a current block to be decoded. For example, the prediction information indicates whether the transform block is to be decoded by intra prediction or inter prediction. Furthermore, for example, the prediction information may be information indicating a prediction direction in intra prediction.

Next, the second decoding unit 102 determines the RP value based on the prediction information (S312). For example, it is known that in the case of inter prediction, there are generally less high frequency components than in intra prediction. Thus, when the prediction information indicates inter prediction, it is sufficient as long as the second decoding unit 102 determines such an RP value that allows the X component and the Y component having small values to be represented by short binary signals. More specifically, when the prediction information indicates inter prediction, it is sufficient as long as the second decoding unit 102 determines an RP value smaller than an RP value determined when the prediction information indicates intra prediction.

Furthermore, when the direction of intra prediction is the horizontal direction, it is generally expected that the Y component of the last position information is smaller than the X component. In view of this, when the prediction direction of intra prediction is the horizontal direction, it is sufficient as long as the second decoding unit 102 determines, as the RP value of the Y component, an RP value smaller than the RP value of the X component. It is to be noted that when the prediction direction of intra prediction is the vertical direction, it is sufficient as long as the second decoding unit 102 determines, as the RP value of the X component, an RP value smaller than the RP value of the Y component.

Lastly, the second decoding unit 102 determines the maximum length of the prefix part based on the prediction information (S313).

As described above, the second decoding unit 102 can vary the code length of the binary signal according to the prediction information, and thus, the coding efficiency can be increased.

Figure 10C:
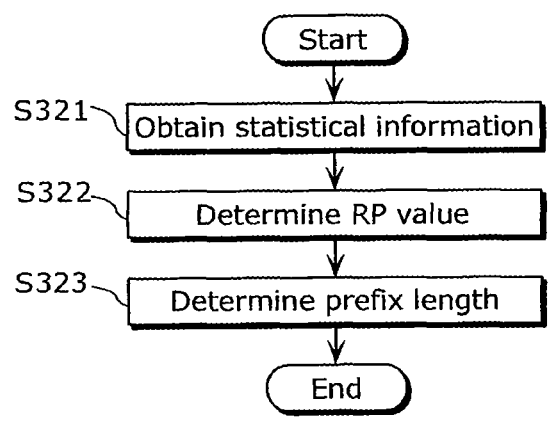
[FIG. 10C]

FIG. 10C shows a method of determining the RP value and the maximum length of the prefix part according to statistical information.

First, the second decoding unit 102 obtains statistical information (S321). The statistical information is, for example, information on statistics of the length of the binary signal of the X component or the Y component included in the last position information of a previously decoded block.

Next, the second decoding unit 102 determines the RP value based on the statistical information (S322). Lastly, the second decoding unit 102 determines the maximum length of the prefix part based on the statistical information (S323).

As described above, the second decoding unit 102 can vary the code length of the binary signal according to the statistical information, and thus, the coding efficiency can be further increased.

Figure 10D:
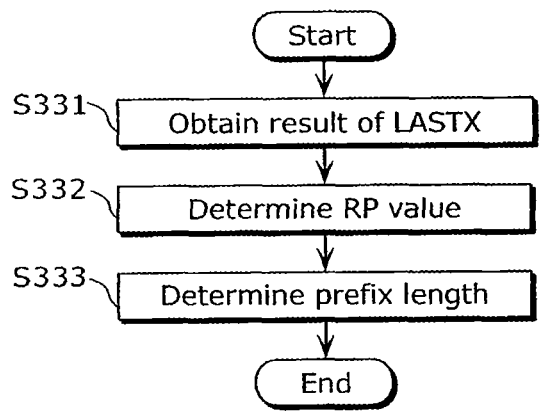
[FIG. 10D]

FIG. 10D shows a method of determining the RP value and the maximum length of the prefix part according to a previously-decoded one of the X component and the Y component.

First, the second decoding unit 102 obtains a previously-decoded one of the X component and the Y component (S331). For example, the second decoding unit 102 obtains a previously-decoded X component when decoding a coded Y component. Furthermore, for example, the second decoding unit 102 may obtain a previously-decoded Y component when decoding a coded X component.

Then, the second decoding unit 102 determines, using the previously-decoded one of the X component and the Y component, the RP value of the other, yet-to-be-decoded one of the X component and the Y component (S332). Generally, it is likely that the X component and the Y component have the same or similar values. Therefore, when the value of a previously-decoded X component is smaller than a certain value (e.g., half the transform size), for example, the second decoding unit 102 determines, as the RP value of the Y component, a value smaller than the RP value of the X component.

Lastly, the second decoding unit 102 determines, using the previously-decoded one of the X component and the Y component, the maximum length of the prefix part of the other, yet-to-be-decoded one of the X component and the Y component (S333).

As described above, the second decoding unit 102 can vary the code length of the binary signal according to a previously-decoded one of the X component and the Y component, and thus, the coding efficiency can be further increased.

It is to be noted that the methods of determining the RP value and the maximum length of the prefix part shown in FIG. 10A to FIG. 10D may be used in combination. For example, when there is no information to refer to, the second decoding unit 102 may determine the RP value based on a predetermined table, whereas when there is information to refer to, the second decoding unit 102 may determine the RP value according to the information which can be referred to.

Moreover, the second decoding unit 102 may determine the maximum length of the prefix part in the same manner as the RP value. It is to be noted that when the values of the X component and the Y component are predicted to be large, it is sufficient as long as the second decoding unit 102 determines the maximum length of the prefix part to be shorter than when the X component and the Y component are predicted to be small. This further increases the coding efficiency.

Figure 11A:
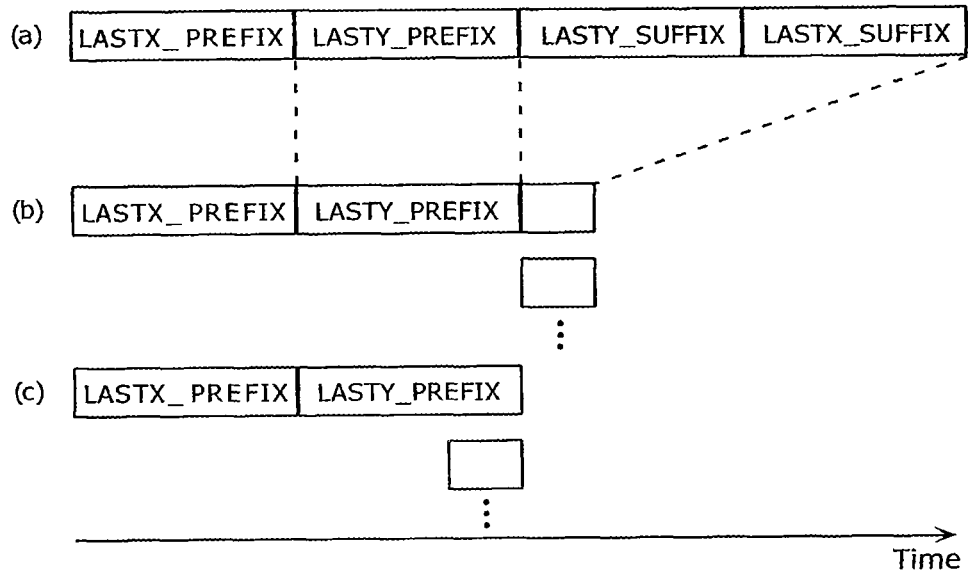
[FIG. 11A]
Figure 11B:
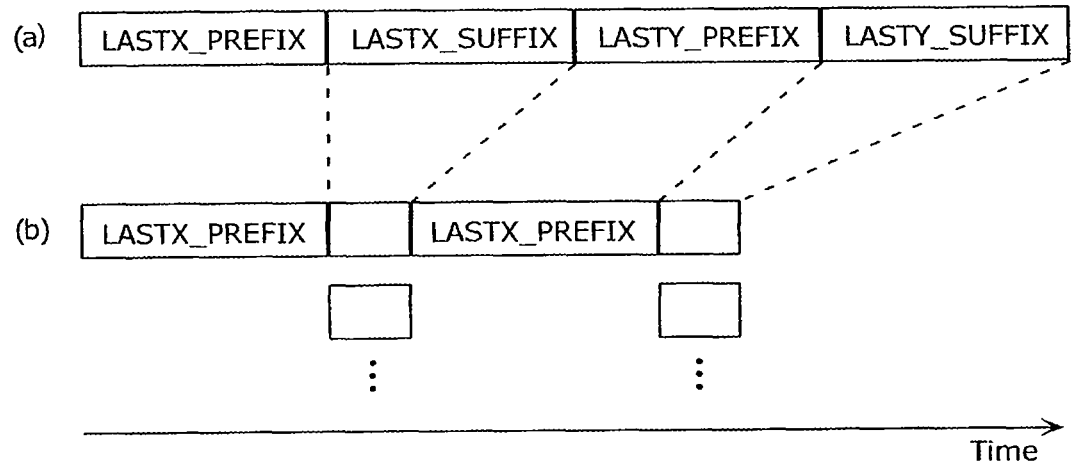
[FIG. 11B]

Next, the following describes, using FIG. 11A and FIG. 11B, a time period required for arithmetic decoding of the coded last position information.

FIG. 11A is a diagram for describing an example of arithmetic decoding according to Embodiment 1. As for FIG. 11A, the following describes the case where the coded prefix part of the X component, the coded prefix part of the Y component, the coded suffix part of the Y component, and the coded suffix part of the X component are included in the bit stream BS in this order.

The part (a) of FIG. 11A shows an example of the case where the prefix part and the suffix part of each component are arithmetically decoded in sequence. As for the part (a) of FIG. 11A, decoding of the prefix part of the X component of the last position information (LASTX_PREFIX), decoding of the prefix part of the Y component (LASTY_PREFIX), decoding of the suffix part of the Y component (LASTY_SUFFIX), and decoding of the suffix part of the X component (LASTX_SUFFIX) are performed in this order.

Here, one might consider arithmetically decoding the last position information in parallel in order to increase the processing speed of the arithmetic decoding. However, since the prefix part is decoded by context adaptive binary arithmetic decoding, it is difficult to perform arithmetic decoding in parallel. To be more specific, a variable probability (probability of symbol occurrence) which is updated based on a coded signal is used in the arithmetic decoding of the prefix part. This means that it is necessary to successively read and update the probability of symbol occurrence. Therefore, it is difficult to parallelize the arithmetic decoding of the prefix part.

On the other hand, it is relatively easy to parallelize the arithmetic decoding of the suffix part because the suffix part is decoded by bypass decoding. To be more specific, the variable probability updated based on a coded signal is not used in the arithmetic decoding of the suffix part, but a fixed probability (probability of symbol occurrence) is used. Therefore, it is relatively easy to parallelize the arithmetic decoding of the suffix part.

In view of this, the arithmetic decoding of the suffix part may be parallelized bitwise as shown in the part (b) of FIG. 11A. This increases the processing speed of the arithmetic decoding of the last position information.

Moreover, when the process is to be further parallelized, information related to the suffix part may be obtained from the bit stream BS, and the arithmetic decoding of the suffix part may start before context adaptive binary arithmetic decoding is completed, as shown in the part (c) of FIG. 11A, for example. This further increases the speed of decoding of the last position information.

FIG. 11B is a diagram for describing an example of arithmetic decoding according to a comparable example. As for FIG. 11B, the following describes the case where the coded prefix part of the X component, the coded suffix part of the X component, the coded prefix part of the Y component, and the coded suffix part of the Y component are included in the bit stream BS in this order.

The part (a) of FIG. 11B shows an example of the case where the prefix part and the suffix part of each component are arithmetically decoded in sequence. The processing time required in the case of the part (a) of FIG. 11B is equal to the processing time required in the case of the part (a) of FIG. 11A. However, in the case of the part (a) of FIG. 11B, the number of times switching is performed between context adaptive binary arithmetic decoding and bypass decoding is larger than in the case of the part (a) of FIG. 11A.

The part (b) of FIG. 11B is a diagram for describing an example of the case where the arithmetic decoding of the suffix part is parallelized bitwise. As for the part (b) of FIG. 11B, bypass decoding of the suffix part is parallelized, and thus the processing time is shorter than in the part (a) of FIG. 11B. However, the decoding of the suffix part of the X component and the decoding of the suffix part of the Y component cannot be parallelized. Thus, the processing time in the part (b) of FIG. 11B is longer than that in the part (b) of FIG. 11A.

As described above, the image decoding apparatus 100 according to Embodiment 1 can efficiently decode the last position information.

More specifically, the image decoding apparatus 100 can reconstruct the last position information by decoding the bit stream in which the coded binary signals of the X component and the Y component included in the last position information are placed after being classified into a group for context adaptive binary arithmetic decoding and a group for bypass decoding. This allows the image decoding apparatus 100 to reduce the number of times the arithmetic decoding methods are switched. Moreover, the image decoding apparatus 100 can arithmetically decode the coded last position information at high speed because it is possible to group partial signals that are to be decoded by bypass decoding, which can be performed in parallel.

To be more specific, the image decoding apparatus 100 can reconstruct the last position information by decoding the bit stream in which a coded partial signal (e.g., the suffix part of the X component) is followed by a partial signal (e.g., the suffix part of the Y component) which has been coded by the same arithmetic coding as the preceding partial signal. Thus, the image decoding apparatus 100 can reduce the number of times the arithmetic decoding methods are switched and efficiently decode the last position information as compared to the case of decoding a bit stream in which partial signals which have been arithmetically coded by different methods are alternately placed.

It is to be noted that the RP values and the maximum lengths of the prefix part shown in FIG. 9B to FIG. 9E are mere examples, and there may be different RP values and different maximum lengths of the prefix part. For example, the maximum length of the prefix part may be shorter and the suffix part may be longer. This further enables parallel arithmetic decoding and further increases the speed of arithmetic decoding.

It is to be noted that each of the structural elements in the present embodiment may be configured in the form of an exclusive hardware product, or may be implemented by executing a software program suitable for the structural element. Each structural element may be implemented by means of a program executing unit, such as a CPU or a processor, reading and executing the software program recorded on a recording medium such as a hard disk or a semiconductor memory. Here, the software program for implementing the image decoding apparatus according to the present embodiment is a program described below.

This program causes a computer to execute an image decoding method for decoding last position information indicating a horizontal position and a vertical position of a last non-zero coefficient in a predetermined order in a current block to be decoded, the image decoding method including: decoding, by first arithmetic decoding, a coded first partial signal and a coded second partial signal which are included in a bit stream, and decoding, by second arithmetic decoding different from the first arithmetic decoding, a coded third partial signal and a coded fourth partial signal which are included in the bit stream; and reconstructing a first component by debinarizing a first binary signal which includes the decoded first partial signal and the decoded third partial signal, and reconstructing a second component by debinarizing a second binary signal which includes the decoded second partial signal and the decoded fourth partial signal, the first component being one of a horizontal component and a vertical component which are included in the last position information, and the second component being the other of the horizontal component and the vertical component, wherein in the bit stream, (i) the coded second partial signal is placed next to the coded first partial signal, or (ii) the coded fourth partial signal is placed next to the coded third partial signal.

(Variation of Embodiment 1)

Figure 12:
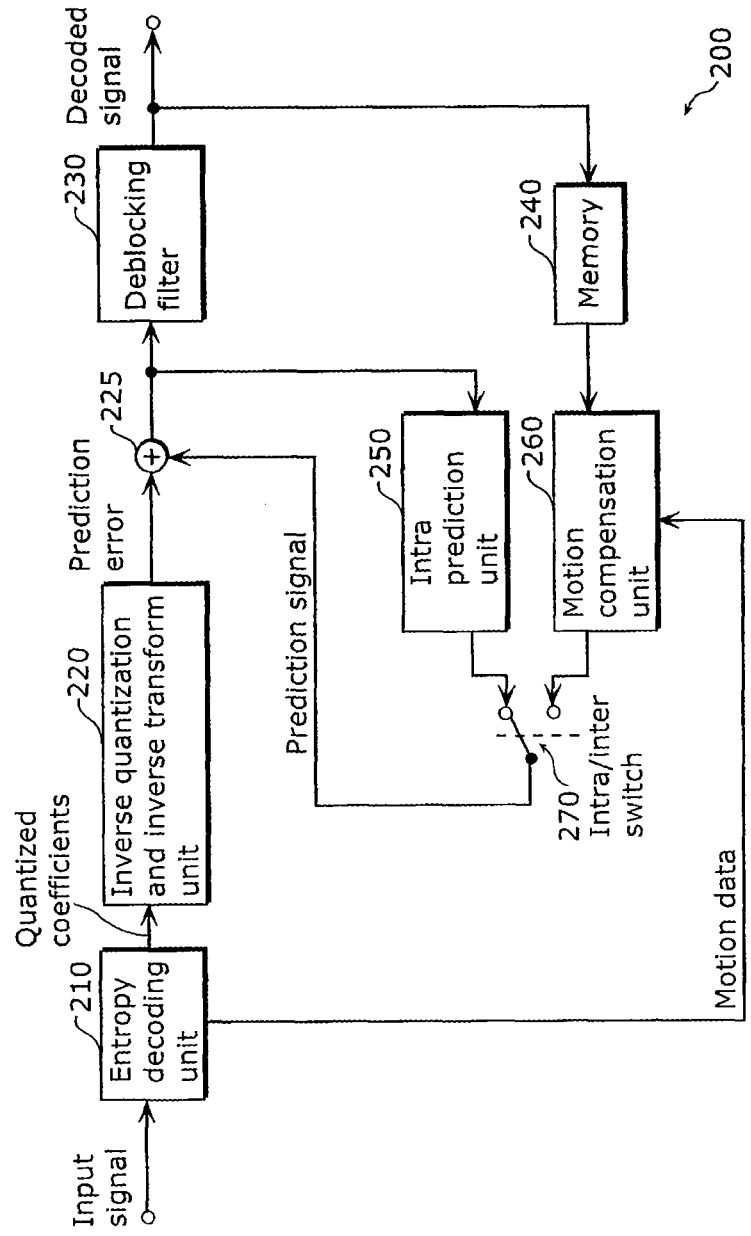
[FIG. 12]

The image decoding apparatus 100 according to Embodiment 1 may be included in an image decoding apparatus below. FIG. 12 is a block diagram showing an example of a configuration of an image decoding apparatus 200 according to a variation of Embodiment 1.

The image decoding apparatus 200 decodes coded image data generated by compression coding. For example, the image decoding apparatus 200 receives coded image data on a block-by-block basis as a current signal to be decoded. The image decoding apparatus 200 performs variable-length decoding, inverse quantization, and inverse transform on the received current signal to reconstruct image data.

As shown in FIG. 12, the image decoding apparatus 200 includes an entropy decoding unit 210, an inverse quantization and inverse transform unit 220, an adder 225, a deblocking filter 230, a memory 240, an intra prediction unit 250, a motion compensation unit 260, and an intra/inter switch 270.

The entropy decoding unit 210 performs variable-length decoding on an input signal (bit stream) to reconstruct quantized coefficients. Here, the input signal is a current signal to be decoded and corresponds to data on a block-by-block basis of the coded image data. The coded image data includes the coded last position information. Furthermore, the entropy decoding unit 210 obtains motion data from the input signal and outputs the motion data to the motion compensation unit 260.

It is to be noted that the image decoding apparatus 100 according to Embodiment 1 corresponds to part of the entropy decoding unit 210. That is to say, the entropy decoding unit 210 decodes the coded last position information.

The inverse quantization and inverse transform unit 220 performs inverse quantization on the quantized coefficients reconstructed by the entropy decoding unit 210, to reconstruct transform coefficients. Then, the inverse quantization and inverse transform unit 220 performs inverse transform on the transform coefficients to reconstruct a prediction error.

The adder 225 adds the prediction error and a prediction signal to generate a decoded image.

The deblocking filter 230 applies a deblocking filter to the decoded image. The resultant decoded image is outputted as a decoded signal.

The memory 240 is a memory for storing a reference image used in motion compensation. More specifically, the memory 240 stores the decoded image to which the deblocking filter has been applied.

The intra prediction unit 250 performs intra prediction to generate a prediction signal (intra prediction signal). More specifically, the intra prediction unit 250 generates an intra prediction signal by performing intra prediction by reference to an image neighboring the current block to be decoded (input signal) in the decoded image generated by the adder 225.

The motion compensation unit 260 performs motion compensation based on the motion data outputted by the entropy decoding unit 210, to generate a prediction signal (inter prediction signal).

The intra/inter switch 270 selects either the intra prediction signal or the inter prediction signal, and outputs the selected signal to the adder 225 as the prediction signal.

With the above configuration, the image decoding apparatus 200 decodes the coded image data generated by compression coding.

(Embodiment 2)

The following describes an image coding apparatus according to Embodiment 2 using the drawings.

Figure 13:
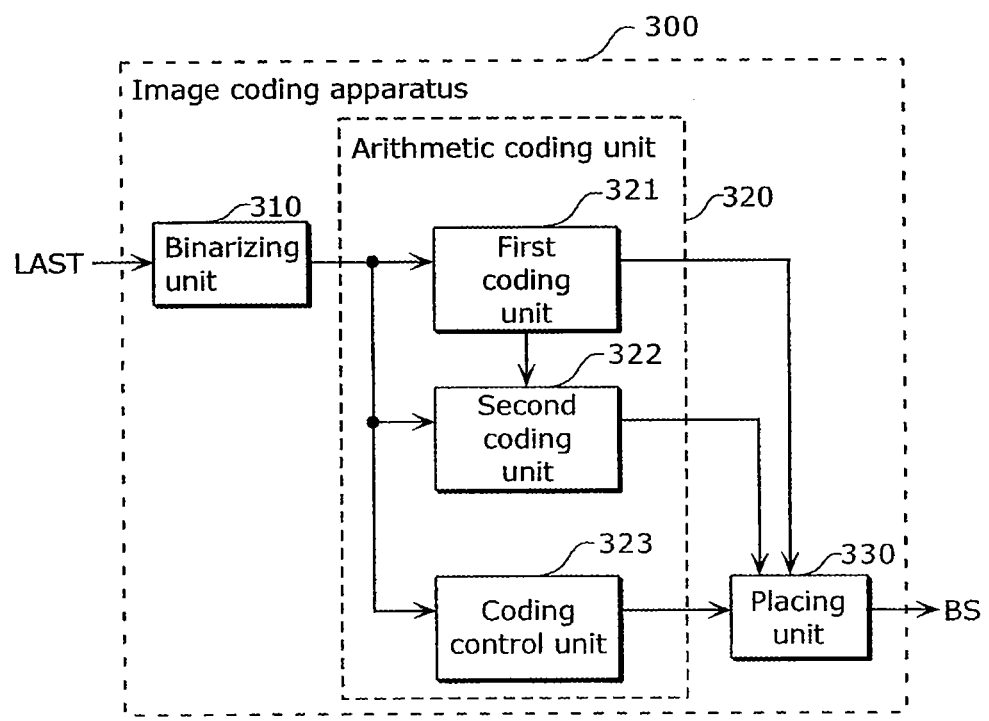
[FIG. 13]

FIG. 13 is a block diagram showing a functional configuration of an image coding apparatus 300 according to Embodiment 2. The image coding apparatus 300 codes the last position information. Described here is the case where the binary signal of the first component (first binary signal) included in the last position information includes the first partial signal and the third partial signal, whereas the binary signal of the second component (second binary signal) included in the last position information includes the second partial signal and the fourth partial signal.

It is to be noted that the first component is one of the horizontal component and the vertical component, and the second component is the other of the horizontal component and the vertical component.

As shown in FIG. 13, the image coding apparatus 300 includes a binarizing unit 310, an arithmetic coding unit 320, and a placing unit 330. The arithmetic coding unit 320 includes a first coding unit 321, a second coding unit 322, and a coding control unit 323.

The binarizing unit 310 binarizes the first component and the second component included in the last position information, to generate the first binary signal and the second binary signal.

The first coding unit 321 codes, by first arithmetic coding, the first partial signal that is a part of the first binary signal and the second partial signal that is a part of the second binary signal. The first arithmetic coding is, for example, context adaptive binary arithmetic coding in which a variable probability updated based on a coded signal is used. It is to be noted that the first arithmetic coding need not be context adaptive binary arithmetic coding.

The second coding unit 322 codes, by second arithmetic coding different from the first arithmetic coding, the third partial signal that is another part of the first binary signal and the fourth partial signal that is another part of the second binary signal. The second arithmetic coding is, for example, bypass coding in which a fixed probability is used. It is to be noted that the second arithmetic coding need not be bypass coding. That is to say, it is sufficient as long as the first arithmetic coding and the second arithmetic coding are different.

The coding control unit 323 manages which one of the first to fourth partial signals is the signal received by the arithmetic coding unit 320. It is to be noted that the coding control unit 323 need not be included in the arithmetic coding unit 320. That is to say, the image coding apparatus 300 need not include the coding control unit 323.

The placing unit 330 places, in a bit stream, the coded first partial signal, the coded second partial signal, the coded third partial signal, and the coded fourth partial signal. Here, the placing unit 330 places the coded second partial signal next to the coded first partial signal, or places the coded fourth partial signal next to the coded third partial signal.

More specifically, the placing unit 330 may place, for example, the coded first partial signal, the coded second partial signal, the coded third partial signal, and the coded fourth partial signal in the bit stream in the following order: the coded first partial signal, the coded second partial signal, the coded third partial signal, and the coded fourth partial signal. Furthermore, the placing unit 330 may place, for example, the coded first partial signal, the coded second partial signal, the coded third partial signal, and the coded fourth partial signal in the bit stream in the following order: the coded first partial signal, the coded second partial signal, the coded fourth partial signal, and the coded third partial signal.

Figure 14A:
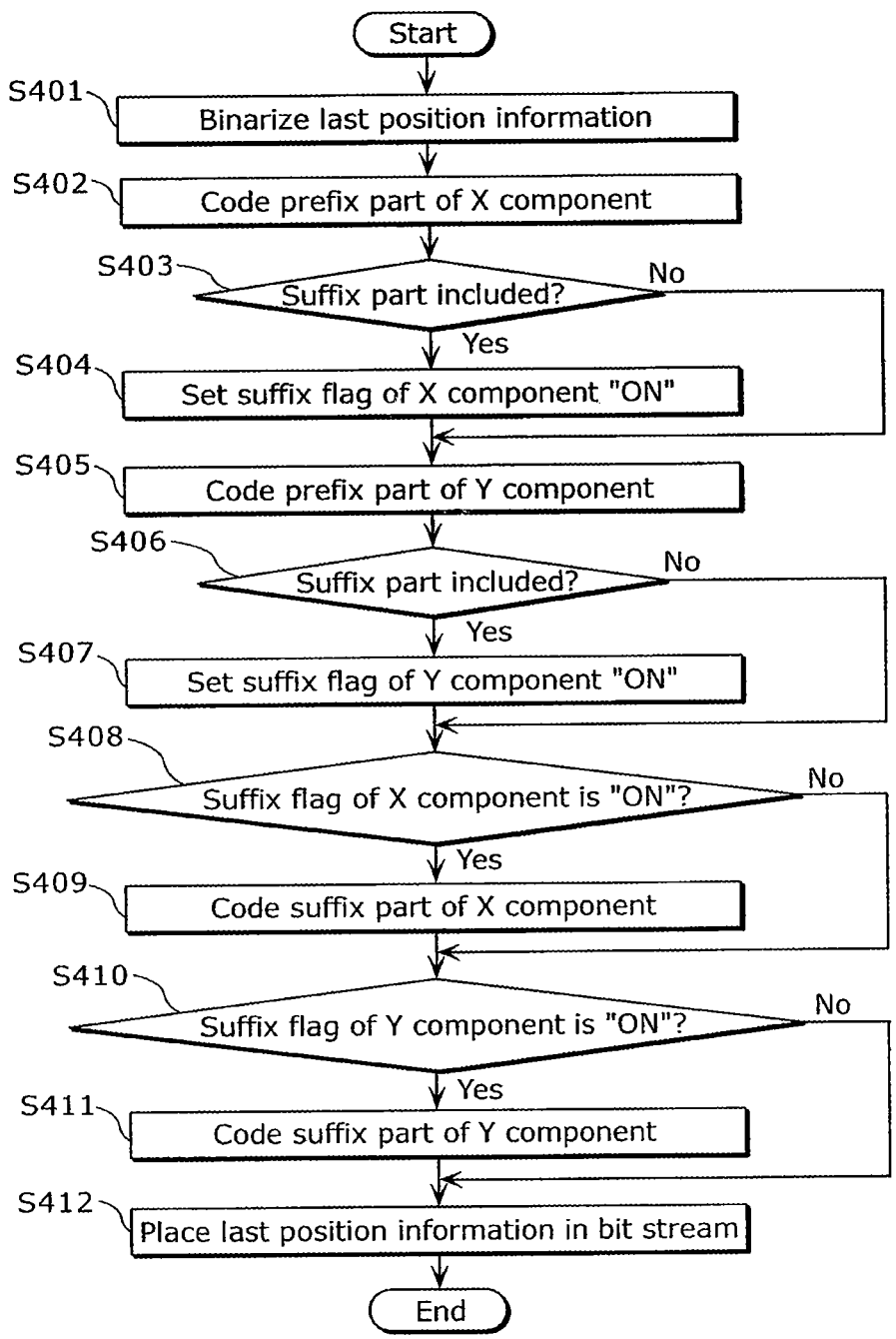
[FIG. 14A]
Figure 14B:
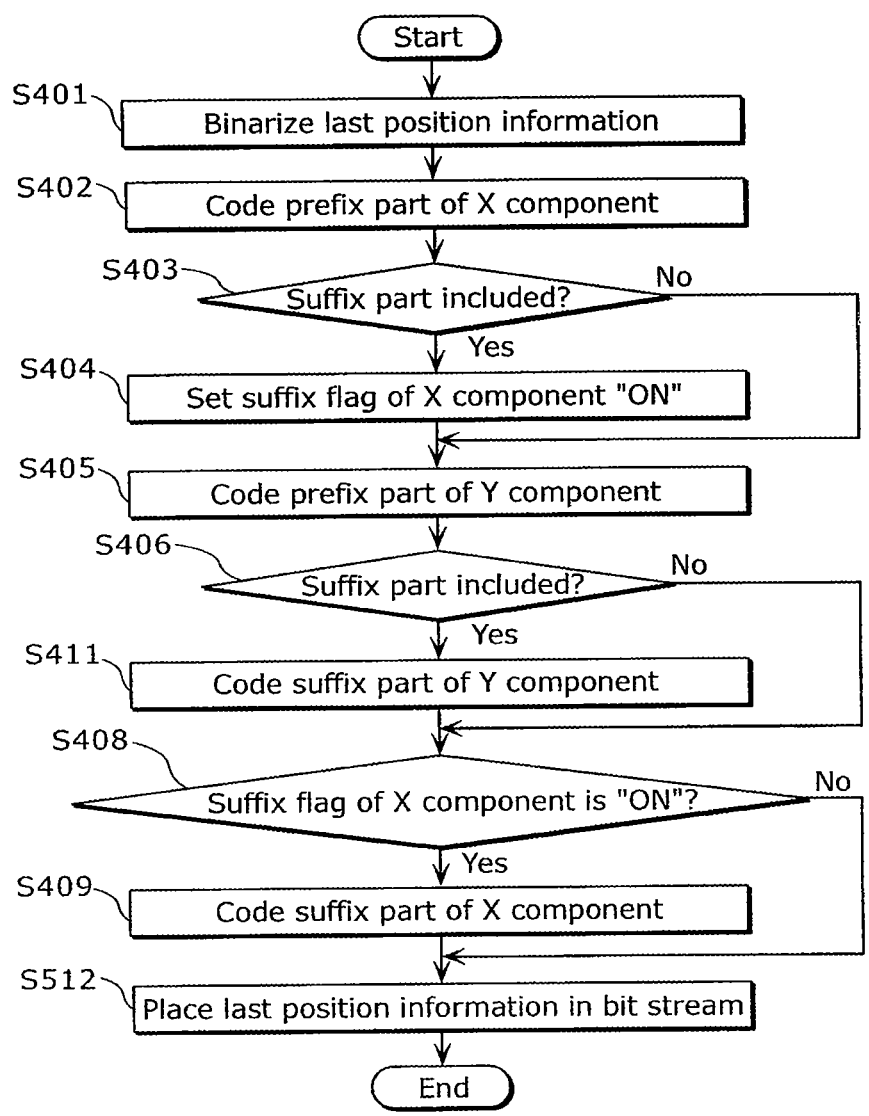
[FIG. 14B]

Next, using FIG. 14A and FIG. 14B, the following describes operations of the image coding apparatus 300 having the above configuration.

Hereinafter, it is assumed that the first component is the X component and the second component is the Y component. It is also assumed that each of the first partial signal and the second partial signal is the prefix part and each of the third partial signal and the fourth partial signal is the suffix part. Furthermore, it is assumed that the suffix flag of the X component and the suffix flag of the Y component are set "OFF" as the default value. It is to be noted that the suffix flag is an internal flag indicating whether or not the binary signal of its corresponding component of the last position information includes the suffix part.

FIG. 14A is a flowchart showing an example of processing operations of the image coding apparatus 300 according to Embodiment 2. To be more specific, FIG. 14A shows a coding method for generating a bit stream which is decodable by the decoding method shown in FIG. 8A.

First, the binarizing unit 310 binarizes each of the X component and the Y component of the last position information (S401). More specifically, the binarizing unit 310 binarizes each of the X component and the Y component (last values) as shown in FIG. 15, for example. Here, the suffix part is binarized by Golomb-Rice coding.

Next, the first coding unit 321 codes, by context adaptive binary arithmetic coding, the prefix part of the X component included in the last position information (S402).

Context adaptive binary arithmetic coding is coding corresponding to context adaptive binary arithmetic decoding shown in FIG. 4. With context adaptive binary arithmetic coding, contexts are switched according to a condition, and a probability of symbol occurrence corresponding to the context switched to is obtained. Then, a binary symbol is arithmetically coded using the obtained probability of symbol occurrence. Furthermore, the probability value corresponding to the context is updated according to the coded binary symbol value (see Non Patent Literature 1).

Next, the first coding unit 321 determines whether or not the binary signal of the X component includes the suffix part (S403). More specifically, the first coding unit 321 determines whether or not the binary signal of the X component includes the suffix part in the same manner as in Step S102 in FIG. 8A.

Here, when the binary signal of the X component includes the suffix part (Yes in S403), the first coding unit 321 sets the suffix flag of the X component "ON" (S404). On the other hand, when the binary signal of the X component does not include the suffix part (No in S403), the first coding unit 321 does not set the suffix flag of the X component "ON". In other words, the suffix flag of the X component remains "OFF". It is to be noted that the first coding unit 321 may set the suffix flag of the X component "OFF" here.

Next, the first coding unit 321 codes, by context adaptive binary arithmetic coding, the prefix part of the Y component included in the last position information (S405). After that, the first coding unit 321 determines whether or not the binary signal of the Y component includes the suffix part (S406).

Here, when the binary signal of the Y component includes the suffix part (Yes in S406), the first coding unit 321 sets the suffix flag of the Y component "ON" (S407). On the other hand, when the binary signal of the Y component does not include the suffix part (No in S406), the first coding unit 321 does not set the suffix flag of the Y component "ON".

Next, the second coding unit 322 determines whether or not the suffix flag of the X component is set "ON" (S408). Here, when the suffix flag of the X component is set "ON" (Yes in S408), the second coding unit 322 codes the suffix part of the X component by bypass coding (S409). On the other hand, when the suffix flag of the X component is not set "ON" (No in S408), Step S409 is skipped.

The second coding unit 322 determines whether or not the suffix flag of the Y component is set "ON" (S410). Here, when the suffix flag of the Y component is set "ON" (Yes in S410), the second coding unit 322 codes the suffix part of the Y component by bypass coding (S411). On the other hand, when the suffix flag of the Y component is not set "ON" (No in S410), Step S411 is skipped.

Lastly, the placing unit 330 places, in the bit stream BS, the coded prefix part of the X component, the coded prefix part of the Y component, the coded suffix part of the X component, and the coded suffix part of the Y component in this order (S412). Here, the placing unit 330 places, in the bit stream BS, the prefix part and the suffix part of each component in the order in which they have been coded.

Next, the following describes the case where the prefix part and the suffix part of each component are placed in the bit stream in an order different from FIG. 14A.

FIG. 14B is a flowchart showing another example of processing operations of the image coding apparatus 300 according to Embodiment 2. To be more specific, FIG. 14B shows a coding method for generating a bit stream which is decodable by the decoding method shown in FIG. 8B. It is to be noted that in FIG. 14B, the processes performed in steps denoted by the same reference signs as those in FIG. 14A are basically the same as the processes described in FIG. 14A.

First, the binarizing unit 310 binarizes each of the X component and the Y component of the last position information (S401). Next, the first coding unit 321 codes, by context adaptive binary arithmetic coding, the prefix part of the X component included in the last position information (S402).

Next, the first coding unit 321 determines whether or not the binary signal of the X component includes the suffix part (S403). Here, when the binary signal of the X component includes the suffix part (Yes in S403), the first coding unit 321 sets the suffix flag of the X component "ON" (S404). On the other hand, when the binary signal of the X component does not include the suffix part (No in S403), the first coding unit 321 does not set the suffix flag of the X component "ON".

Then, the first coding unit 321 codes the prefix part of the Y component by context adaptive binary arithmetic coding (S405). After that, the first coding unit 321 determines whether or not the binary signal of the Y component includes the suffix part (S406).

Here, when the binary signal of the Y component includes the suffix part (Yes in S406), the second coding unit 322 codes the suffix part of the Y component by bypass coding (S411). On the other hand, when the binary signal of the Y component does not include the suffix part (No in S406), Step S411 is skipped.

Next, the second coding unit 322 determines whether or not the suffix flag of the X component is set "ON" (S408). Here, when the suffix flag of the X component is set "ON" (Yes in S408), the second coding unit 322 codes the suffix part of the X component by bypass coding (S409). On the other hand, when the suffix flag of the X component is not set "ON" (No in S408), Step S409 is skipped.

Lastly, the placing unit 330 places, in the bit stream BS, the coded prefix part of the X component, the coded prefix part of the Y component, the coded suffix part of the Y component, and the coded suffix part of the X component in this order (S512). Here, the placing unit 330 places, in the bit stream BS, the prefix part and the suffix part of each component in the order in which they have been coded.

By consecutively coding the prefix part and the suffix part of the Y component in the above-described manner, it is possible to code the binary signal of the Y component without holding, in a memory, information indicating whether or not the binary signal of the Y component includes the suffix part (the suffix flag of the Y component in FIG. 14A). This reduces the capacity required of the memory.

It is to be noted that in the flowcharts shown in FIG. 14A and FIG. 14B, it is not necessary to perform the determination regarding the suffix parts (S403 and S406), the setting of the suffix flags (S404 and S407), and the determination regarding the suffix flags (S408 and S410) when it is determined in advance that the binary signals of the X component and the Y component each include the suffix part.

Next, using FIG. 15, the following briefly describes a method of coding the prefix part and the suffix part included in the last position information.

FIG. 15 is a diagram showing an example of binary signals of the last position information when the block size is 16×16. In FIG. 15, the maximum length of the prefix part is "4" and RP is "2".

When the prefix part is shorter than the maximum length of the prefix part, the first coding unit 321 codes, by context adaptive binary arithmetic coding, as many "0" as the number indicated by the value of the X component. Lastly, the first coding unit 321 codes "1" by context adaptive binary arithmetic coding. In this case, the binary signal of the X component does not include the suffix part, and thus the coding of the X component finishes here.

On the other hand, when the prefix part is longer than the maximum length of the prefix part, the first coding unit 321 codes, by context adaptive binary arithmetic coding, as many "0" as the number of the maximum length.

Next, the second coding unit 322 codes the first half of the suffix part. More specifically, the second coding unit 322 adds "1" to the first half in the unit of the number representable by 2 to the RPth power (e.g., in the unit of "4" when RP is "2"), codes the resultant value, and lastly codes "0".

That is to say, when the value of the X component is greater than or equal to 4 and less than 8, the second coding unit 322 only codes "0" as the first half. When the value of the X component is greater than or equal to 8 and less than 12, the second coding unit 322 codes "10" as the first half. When the value of the X component is greater than or equal to 12 and less than 16, the second coding unit 322 codes "110" as the first half.

It is to be noted that in the example of FIG. 15, the amount of information to be represented by the suffix part is "12" (16−4=12), and thus, when the value of the X component is greater than or equal to 12 and less than 16, instead of coding "110" as the first half, "11" which is obtained by omitting the last "0" of "110" is coded. This reduces the code length.

Next, the second coding unit 322 codes the second half of the suffix part. The second half is a fixed-length part having a length indicated by the RP value. In the example of FIG. 15, the second half indicates a value which is obtained by binarizing a number among the numbers up to 2 to the RPth power and outputting the resultant value from the number on the left to the number on the right. More specifically, the second half indicates a value obtained by binarizing 0, 1, 2, or 3. This is a mere example, and the coding efficiency is not affected in particular as long as there is consistency between the method used by the coding apparatus and the method used by the decoding apparatus.

It is to be noted that even in FIG. 14A and FIG. 14B, it is possible to parallelize the coding of the suffix part and increase the speed of arithmetic coding as in FIG. 11A described in Embodiment 1.

As described above, with the image coding apparatus 300 according to the present embodiment, in a bit stream, a coded partial signal (e.g., the suffix part of the X component) is followed by a partial signal (e.g., the suffix part of the Y component) which has been coded by the same arithmetic coding as the preceding partial signal. Thus, when the arithmetically coded last position information is decoded, it is possible to reduce the number of times the arithmetic decoding methods are switched as compared to the case where the partial signals arithmetically coded by different methods are alternately placed. That is to say, the image coding apparatus 300 can output a bit stream from which the last position information can be efficiently decoded.

It is to be noted that each of the structural elements in the present embodiment may be configured in the form of an exclusive hardware product, or may be implemented by executing a software program suitable for the structural element. Each structural element may be implemented by means of a program executing unit, such as a CPU or a processor, reading and executing the software program recorded on a recording medium such as a hard disk or a semiconductor memory. Here, the software program for implementing the image coding apparatus according to the present embodiment is a program described below.

This program causes a computer to execute an image coding method for coding last position information indicating a horizontal position and a vertical position of a last non-zero coefficient in a predetermined order in a current block to be coded, the image coding method including: binarizing a first component and a second component to generate a first binary signal and a second binary signal, respectively, the first component being one of a horizontal component and a vertical component which are included in the last position information, and the second component being the other of the horizontal component and the vertical component; coding a first partial signal and a second partial signal by first arithmetic coding, and coding a third partial signal and a fourth partial signal by second arithmetic coding different from the first arithmetic coding, the first partial signal being a part of the first binary signal, the second partial signal being a part of the second binary signal, the third partial signal being another part of the first binary signal, and the fourth partial signal being another part of the second binary signal; and placing the coded first partial signal, the coded second partial signal, the coded third partial signal, and the coded fourth partial signal in a bit stream, wherein in the placing, (i) the coded second partial signal is placed next to the coded first partial signal, or (ii) the coded fourth partial signal is placed next to the coded third partial signal.

(Variation of Embodiment 2)

Figure 16:
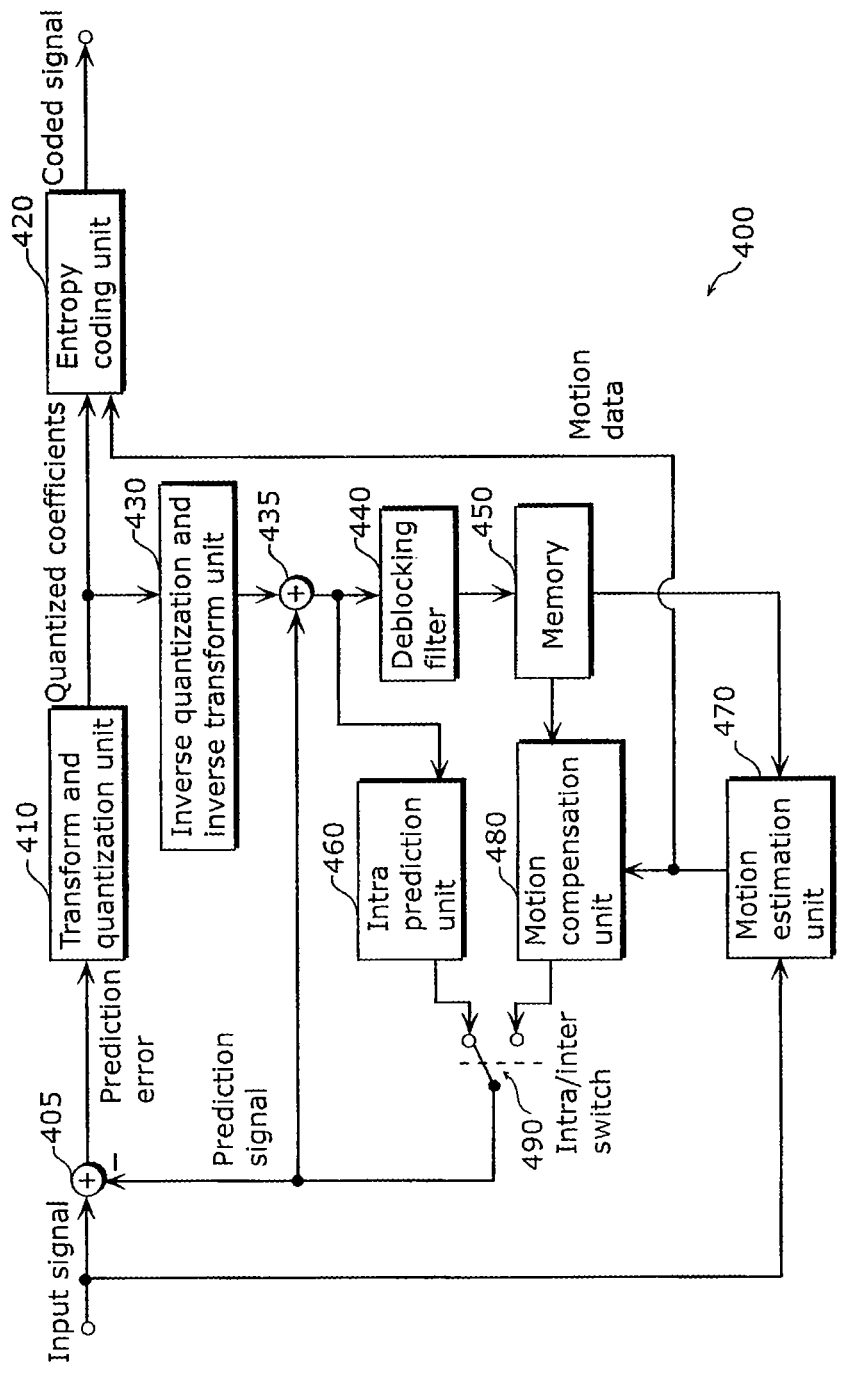
[FIG. 16]

The image coding apparatus 300 according to Embodiment 2 may be included in an image coding apparatus below. FIG. 16 is a block diagram showing an example of a configuration of an image coding apparatus 400 according to a variation of Embodiment 2.

The image coding apparatus 400 performs compression coding on image data. For example, the image coding apparatus 400 receives the image data on a block-by-block basis as an input signal. The image coding apparatus 400 performs transform, quantization, and variable-length coding on the input signal to generate a coded signal (bit stream).

As shown in FIG. 16, the image coding apparatus 400 includes a subtractor 405, a transform and quantization unit 410, an entropy coding unit 420, an inverse quantization and inverse transform unit 430, an adder 435, a deblocking filter 440, a memory 450, an intra prediction unit 460, a motion estimation unit 470, a motion compensation unit 480, and an intra/inter switch 490.

The subtractor 405 calculates a difference between the input signal and the prediction signal as a prediction error.

The transform and quantization unit 410 transforms the prediction error in the spatial domain to generate transform coefficients in the frequency domain. For example, the transform and quantization unit 410 performs discrete cosine transform (DCT) on the prediction error to generate the transform coefficients. Furthermore, the transform and quantization unit 410 quantizes the transform coefficients to generate quantized coefficients.

The entropy coding unit 420 performs variable-length coding on the quantized coefficients to generate a coded signal.

Furthermore, the entropy coding unit 420 codes motion data (e.g., motion vector) detected by the motion estimation unit 470, to output the coded signal with the motion data included therein.

It is to be noted that the image coding apparatus 300 according to Embodiment 2 corresponds to part of the entropy coding unit 420. That is to say, the entropy coding unit 420 codes the last position information.

The inverse quantization and inverse transform unit 430 performs inverse quantization on the quantized coefficients to reconstruct transform coefficients. Furthermore, the inverse quantization and inverse transform unit 430 performs inverse transform on the reconstructed transform coefficients to reconstruct a prediction error. It is to be noted that the reconstructed prediction error lacks information due to the quantization and thus is not the same as the prediction error generated by the subtractor 405. In other words, the reconstructed prediction error contains a quantization error.

The adder 435 adds up the reconstructed prediction error and a prediction signal to generate a local decoded image.

The deblocking filter 440 applies a deblocking filter to the local decoded image.

The memory 450 is a memory for storing a reference image used in motion compensation. More specifically, the memory 450 stores the local decoded image to which the deblocking filter has been applied.

The intra prediction unit 460 performs intra prediction to generate a prediction signal (intra prediction signal). More specifically, the intra prediction unit 460 generates an intra prediction signal by performing intra prediction by reference to an image neighboring the current block to be coded (input signal) in the local decoded image generated by the adder 435.

The motion estimation unit 470 detects motion data (e.g., motion vector) between the input signal and the reference image stored in the memory 450.

The motion compensation unit 480 performs motion compensation based on the motion data to generate a prediction signal (inter prediction signal).

The intra/inter switch 490 selects either the intra prediction signal or the inter prediction signal, and outputs the selected signal to the subtractor 405 and the adder 435 as the prediction signal.

With the above configuration, the image coding apparatus 400 performs compression coding on the image data.

Although only some exemplary embodiments have been described above, the scope of the Claims of the present application is not limited to these embodiments. Those skilled in the art will readily appreciate that various modifications may be made in these exemplary embodiments and that other embodiments may be obtained by arbitrarily combining the structural elements of the embodiments without materially departing from the novel teachings and advantages of the subject matter recited in the appended Claims. Accordingly, all such modifications and other embodiments are included in the present disclosure.

For example, although each embodiment above has specifically described the decoding or coding of the last position information, it is also possible to decode and code the X component and the Y component of a motion vector in the same manner as that described above. More specifically, it is possible to perform coding and decoding without buffering information indicating whether or not the suffix part of the Y component is present, by placing a bypass-coded part including the suffix part of the Y component and a positive/negative code and a bypass-coded part including the suffix part of the X component and a positive/negative code next to the prefix part of the X component (context-adaptive-coded part) and the prefix part of the Y component (context-adaptive-coded part). It is to be noted that the details of motion vector information are described in detail in Non Patent Literature 1 and thus a description thereof is omitted here.

Furthermore, although the suffix part is binarized by Golomb-Rice coding in each embodiment above, the suffix part may be binarized with a different method. For example, the suffix part may be binarized with a fixed length as shown in FIG. 3A to FIG. 3D.

Moreover, the method of binarizing the X component and the Y component in each embodiment above is a mere example, and they may be binarized with a different binarizing method. For example, in FIG. 3A to FIG. 3D, the last value may be binarized with "0" and "1" reversed. More specifically, in FIG. 3B, the last value "3" may be binarized into "1110", for example.

Furthermore, although each embodiment above has shown the example where (i) the prefix part of the X component, the prefix part of the Y component, the suffix part of the X component, and the suffix part of the Y component are placed in this order or (ii) the prefix part of the X component, the prefix part of the Y component, the suffix part of the Y component, and the suffix part of the X component are placed in this order, the placing order of these prefix and suffix parts is not limited to this example. For example, the prefix part of the Y component and the prefix part of the X component may be placed in this order.

(Embodiment 3)

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 17:
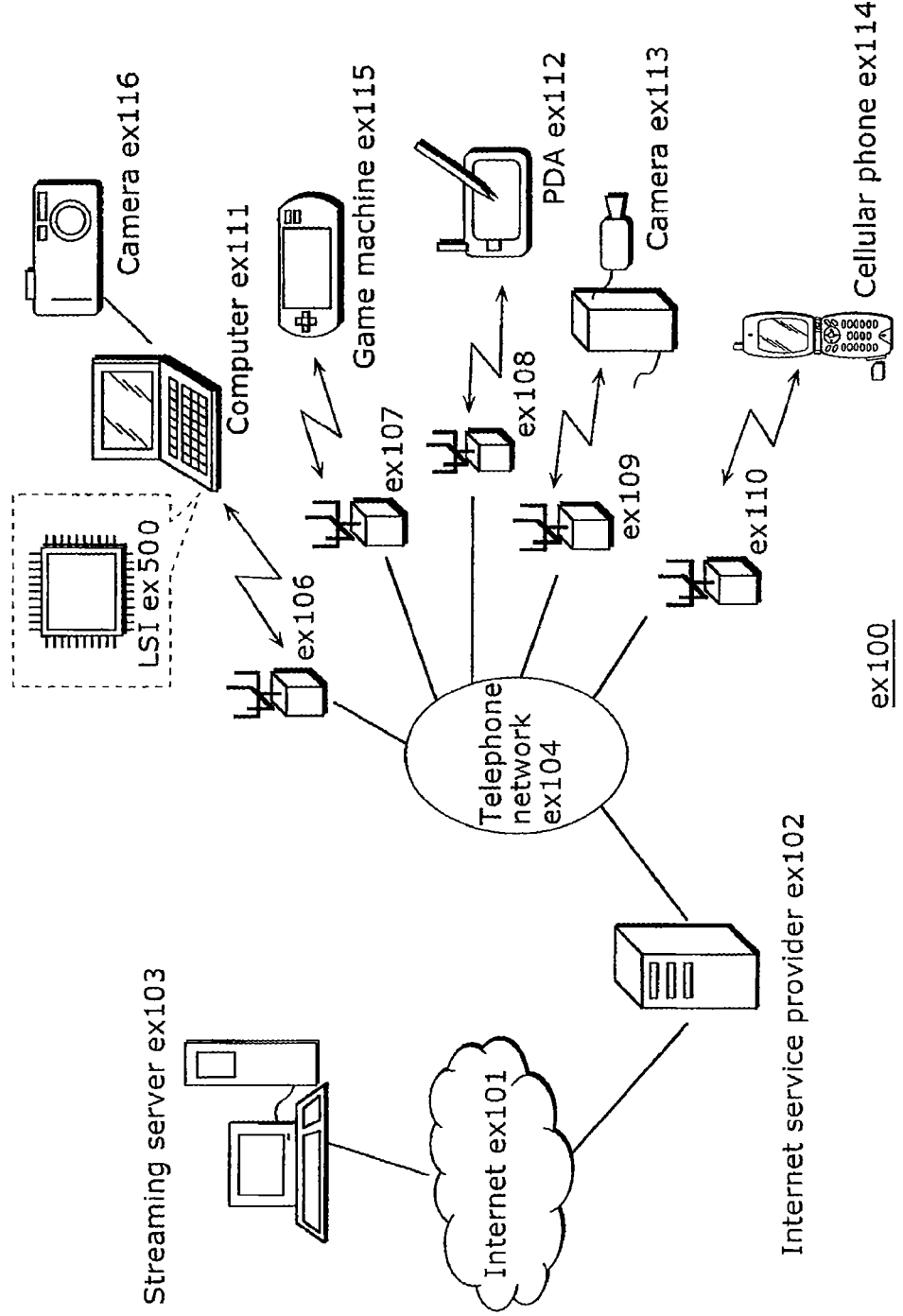
[FIG. 17]

FIG. 17 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 17, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present disclosure), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 18:
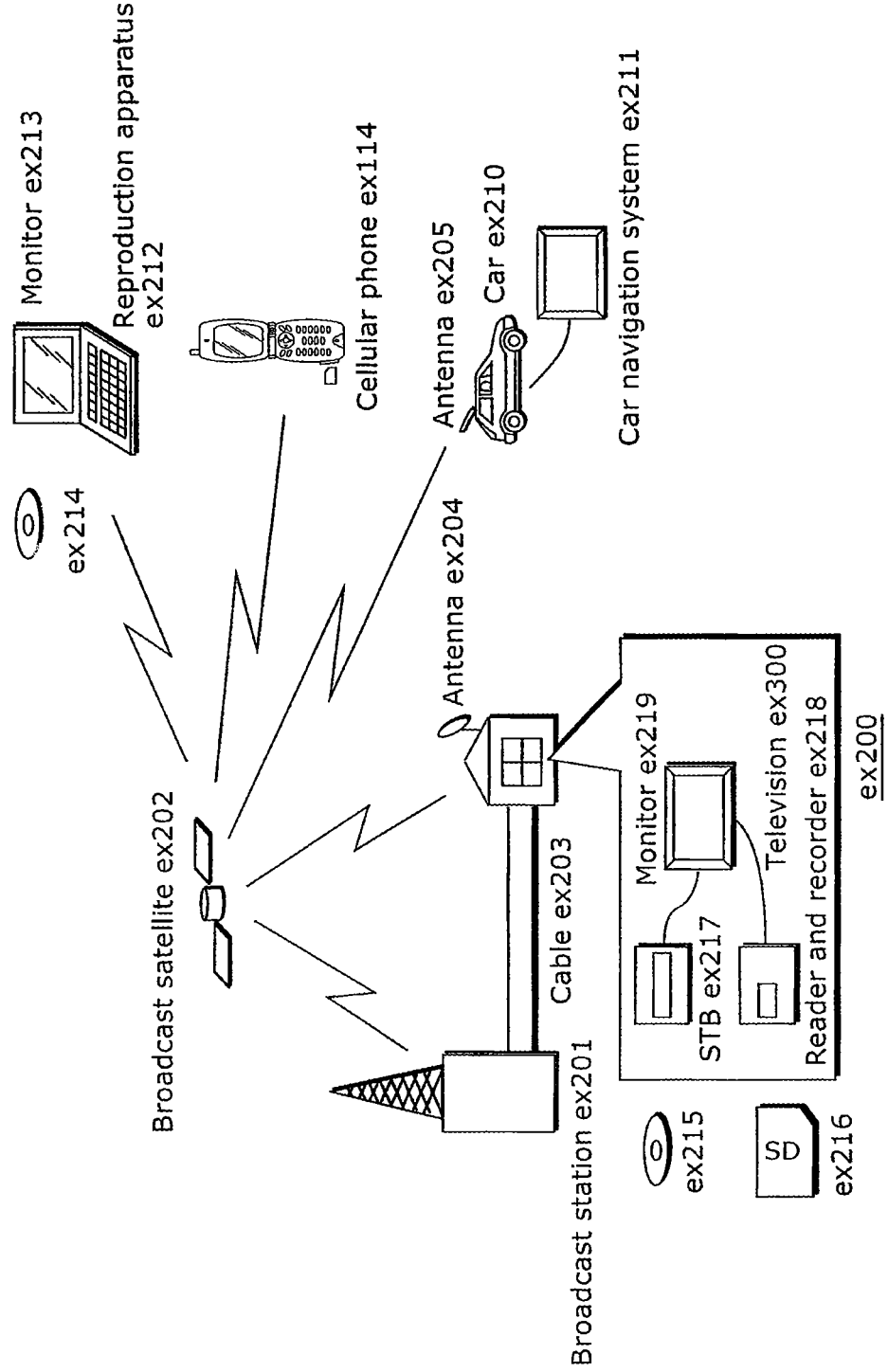
[FIG. 18]

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 18. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 19:
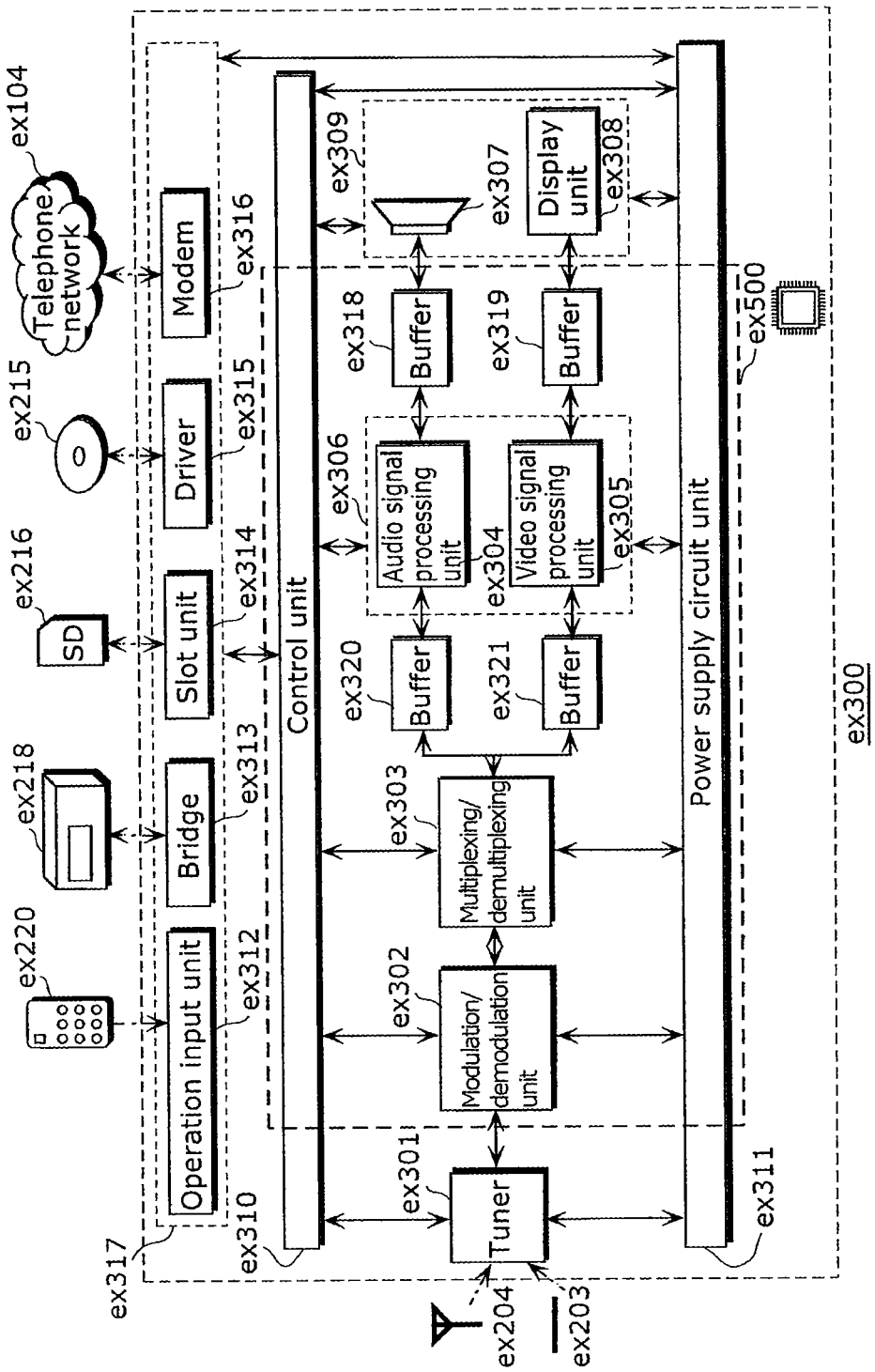
[FIG. 19]

FIG. 19 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 20:
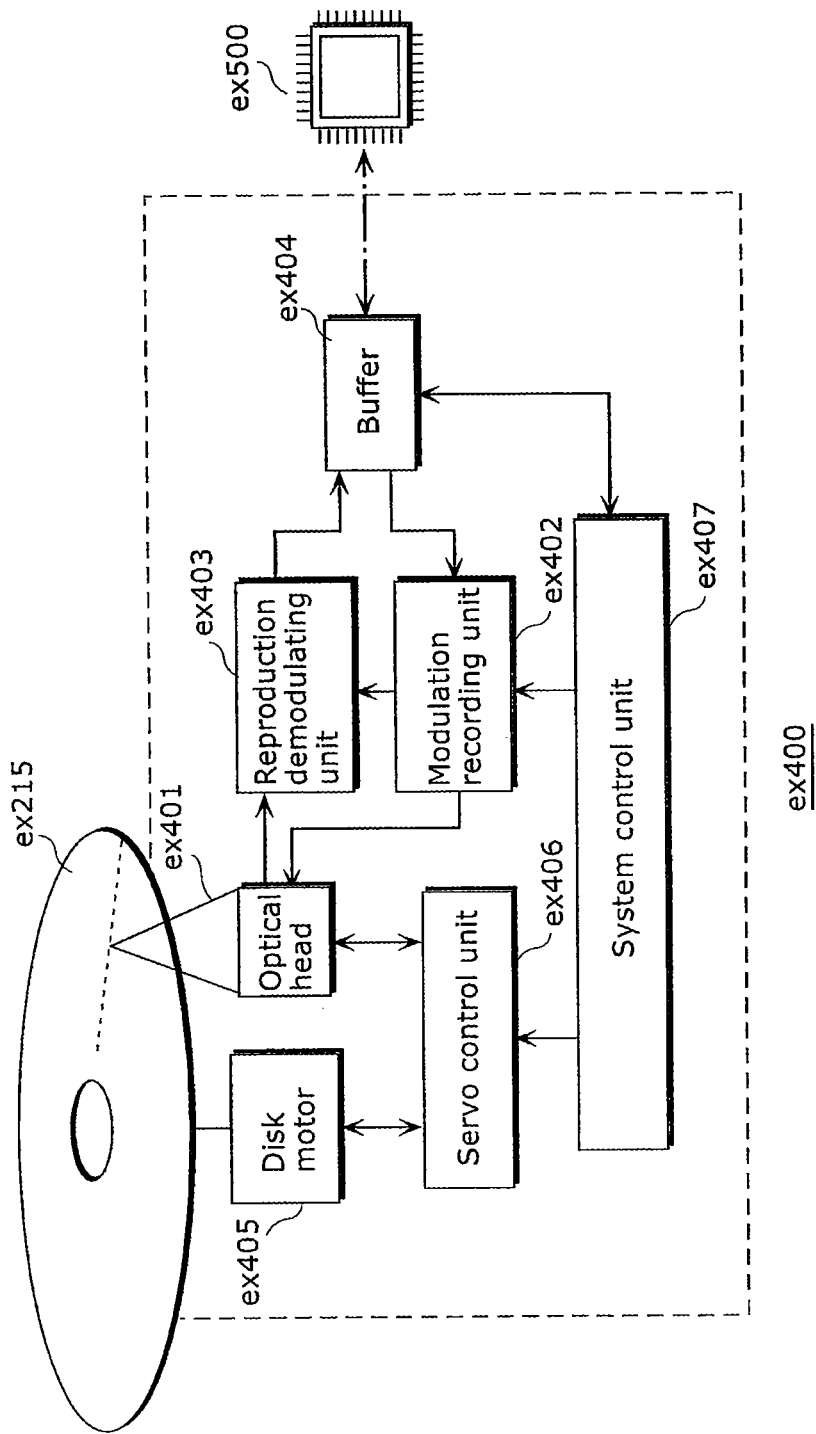
[FIG. 20]

As an example, FIG. 20 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 21:
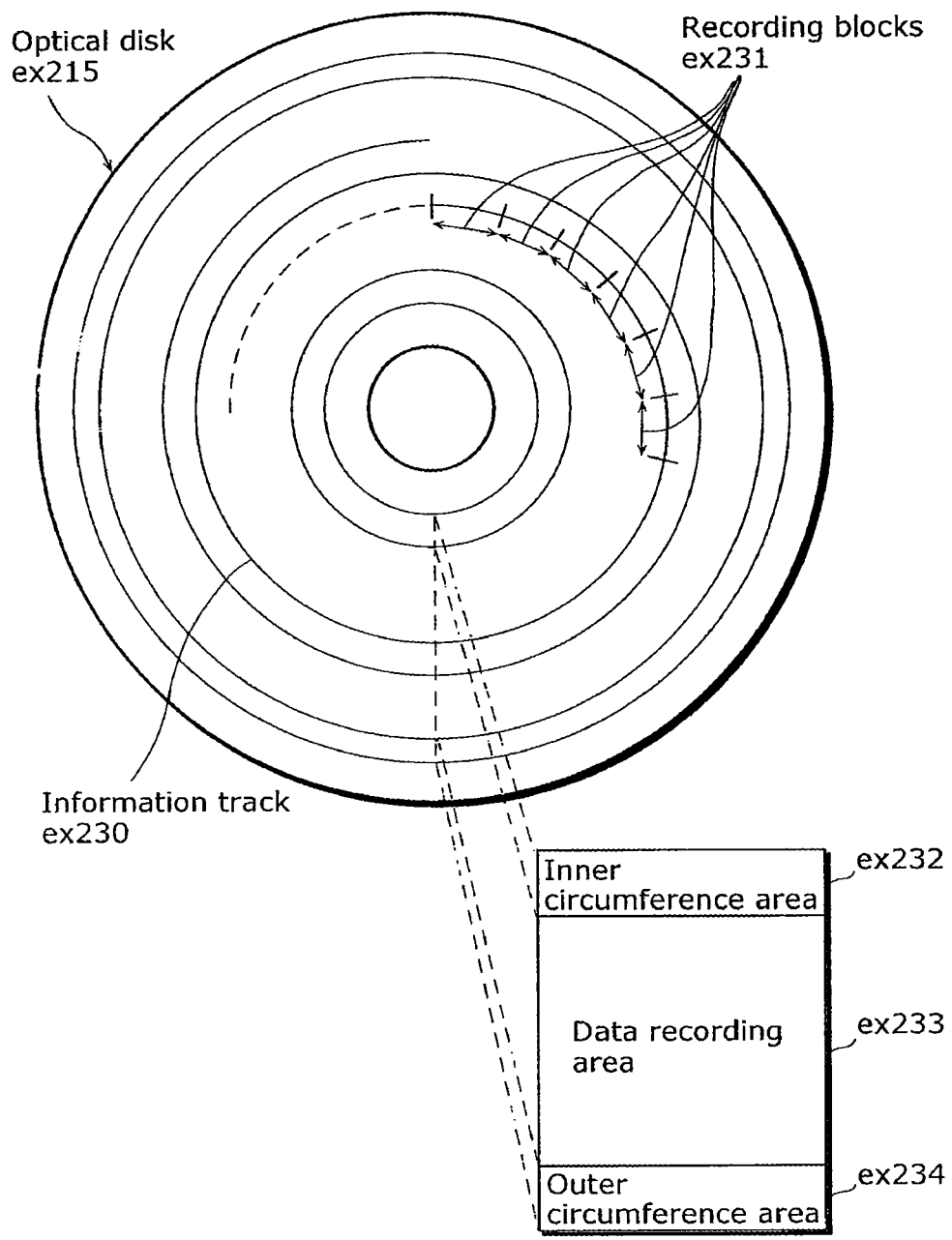
[FIG. 21]

FIG. 21 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 19. The same will be true for the configuration of the computer ex111, the cellular phone ex114, and others.

Figure 22A:
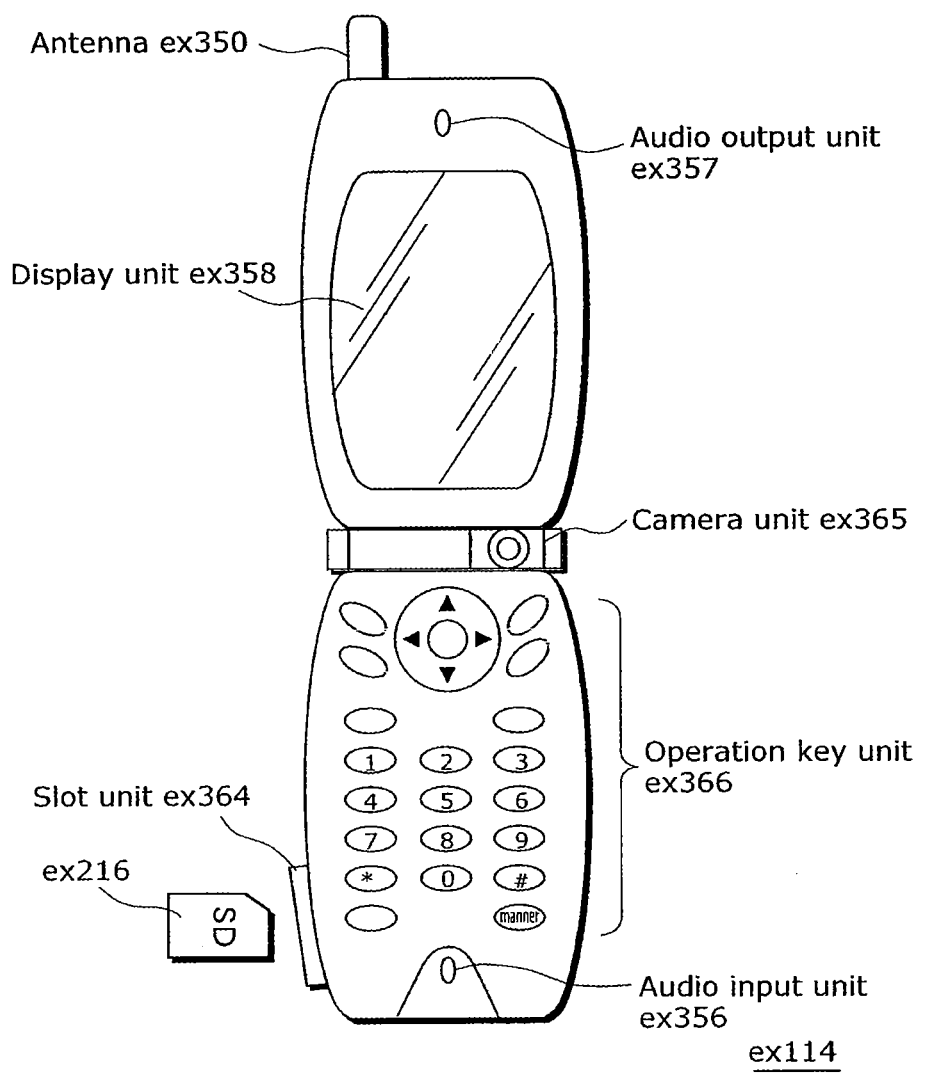
[FIG. 22A]

FIG. 22A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 22B:
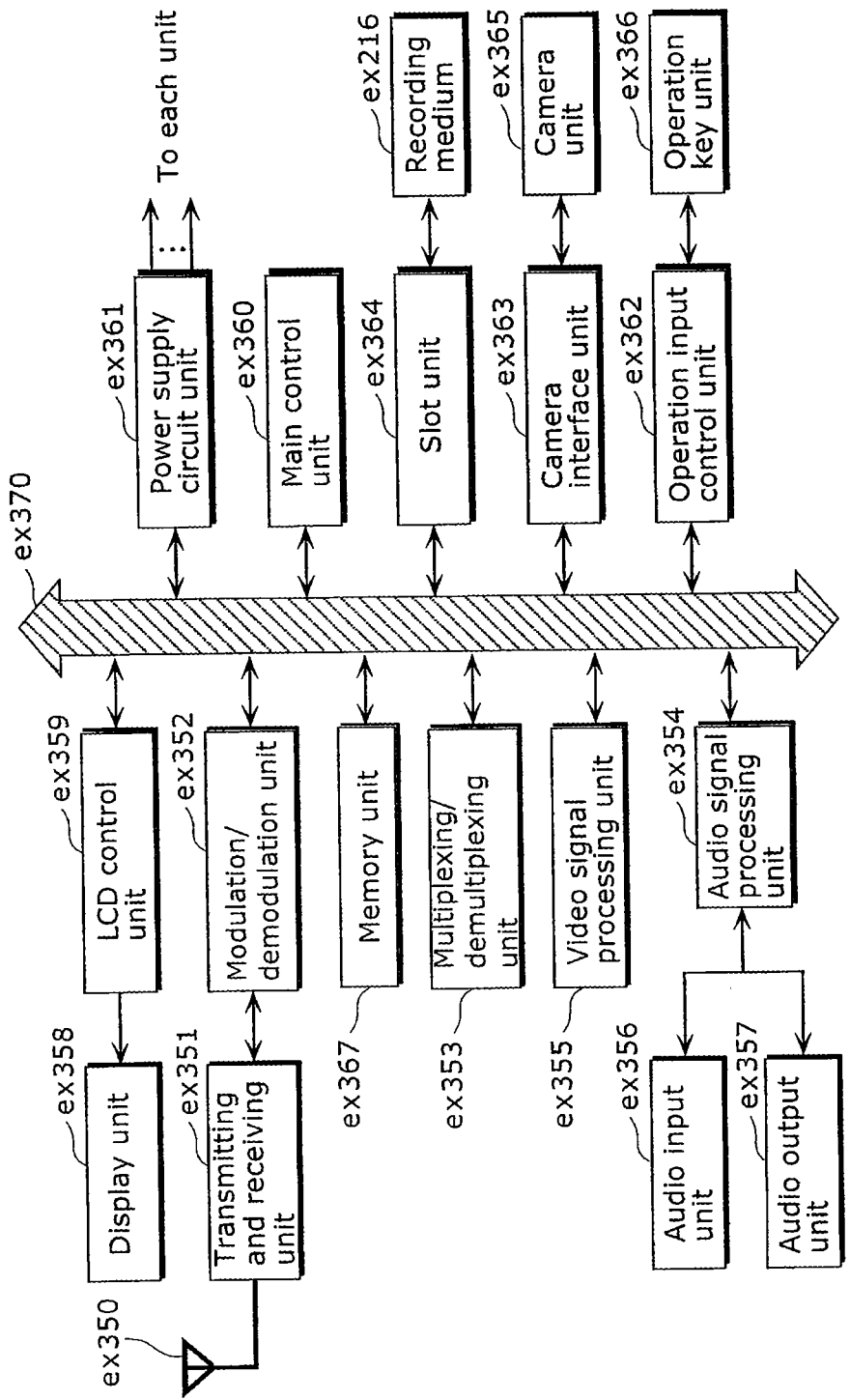
[FIG. 22B]

Next, an example of a configuration of the cellular phone ex114 will be described with reference to FIG. 22B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present disclosure), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present disclosure is not limited to embodiments, and various modifications and revisions are possible without departing from the scope of the present disclosure.

(Embodiment 4)

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conforms cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

Figure 23:
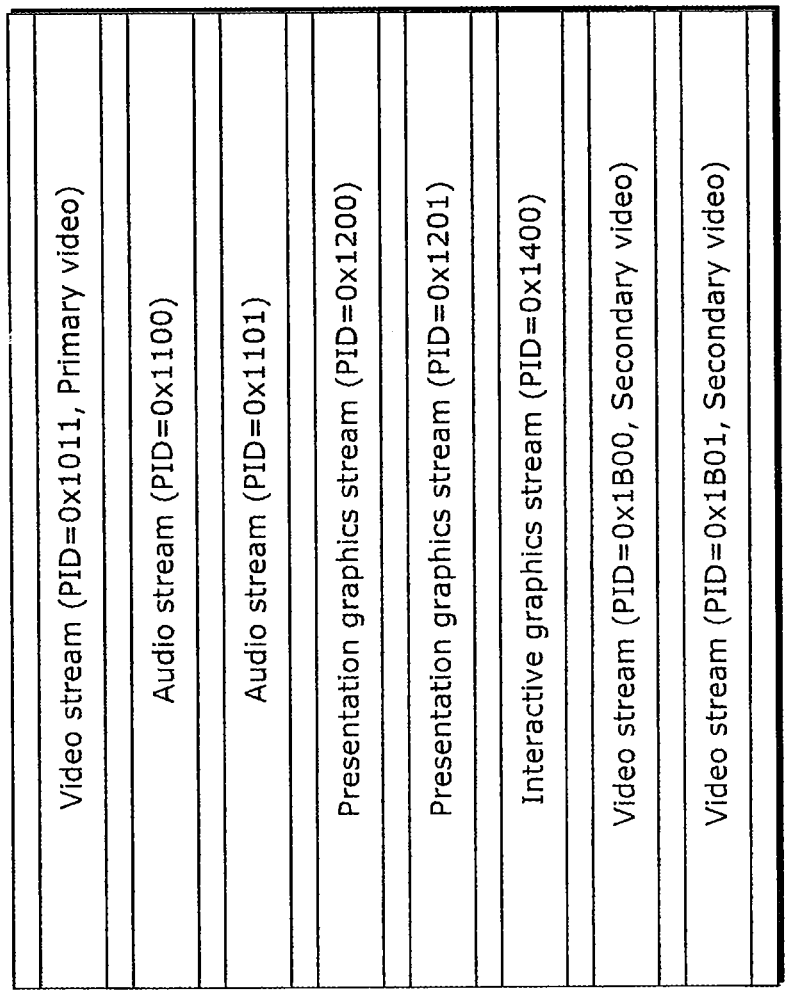
[FIG. 23]

FIG. 23 illustrates a structure of the multiplexed data. As illustrated in FIG. 23, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 24:
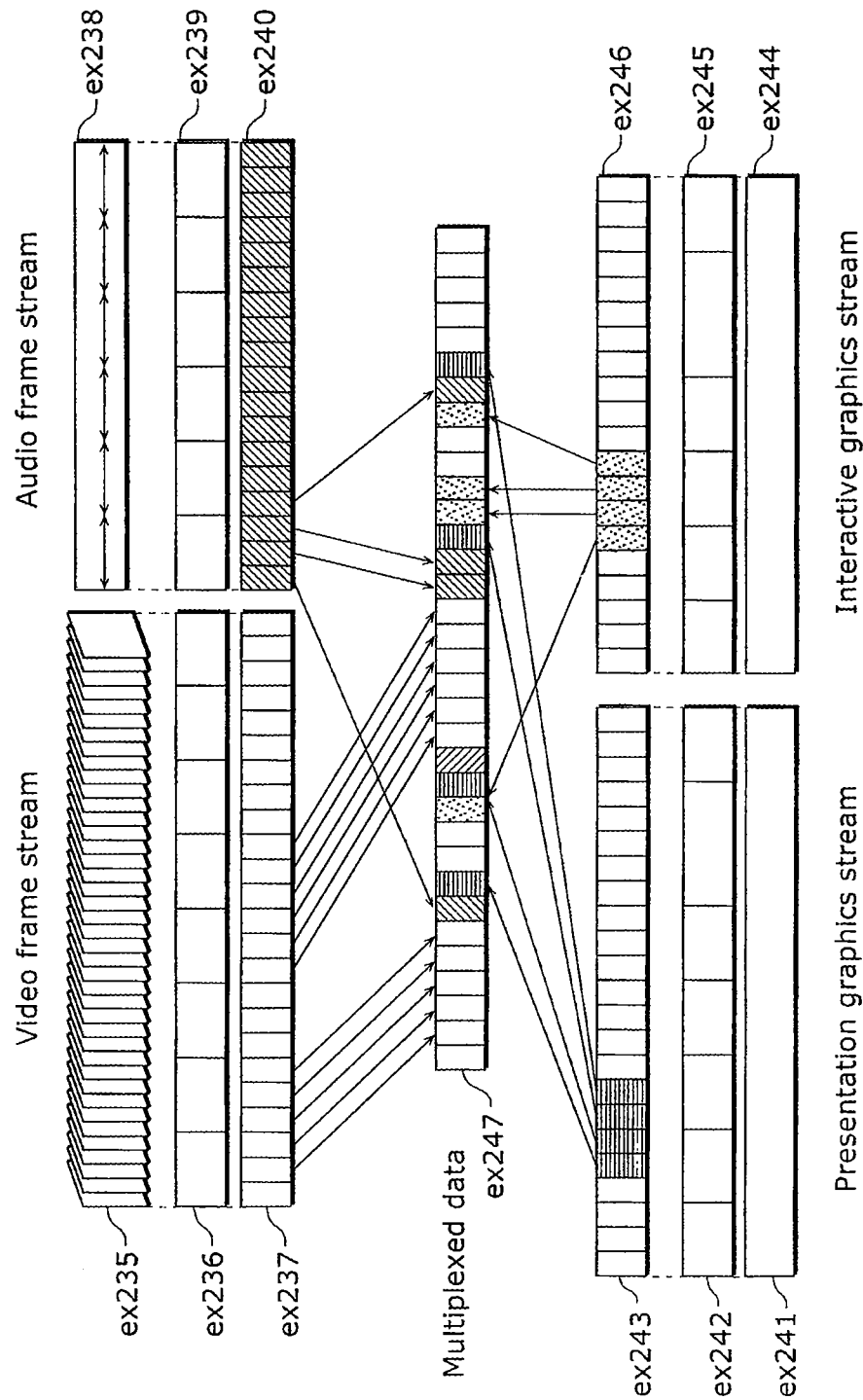
[FIG. 24]

FIG. 24 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 25:
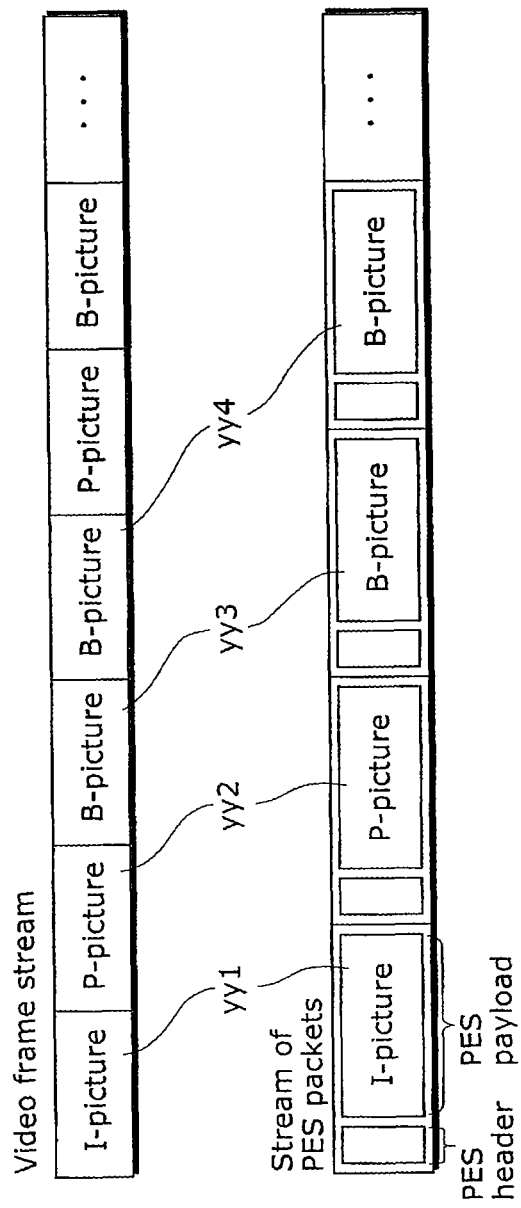
[FIG. 25]

FIG. 25 illustrates how a video stream is stored in a stream of PES packets in more detail. The first bar in FIG. 25 shows a video frame stream in a video stream. The second bar shows the stream of PES packets. As indicated by arrows denoted as yy1, yy2, yy3, and yy4 in FIG. 25, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 26 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 26. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 27:
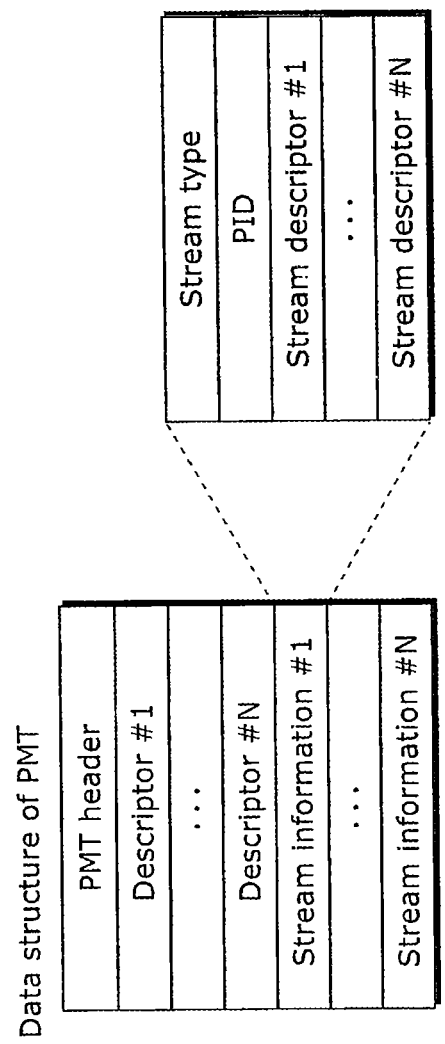
[FIG. 27]

FIG. 27 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 28:
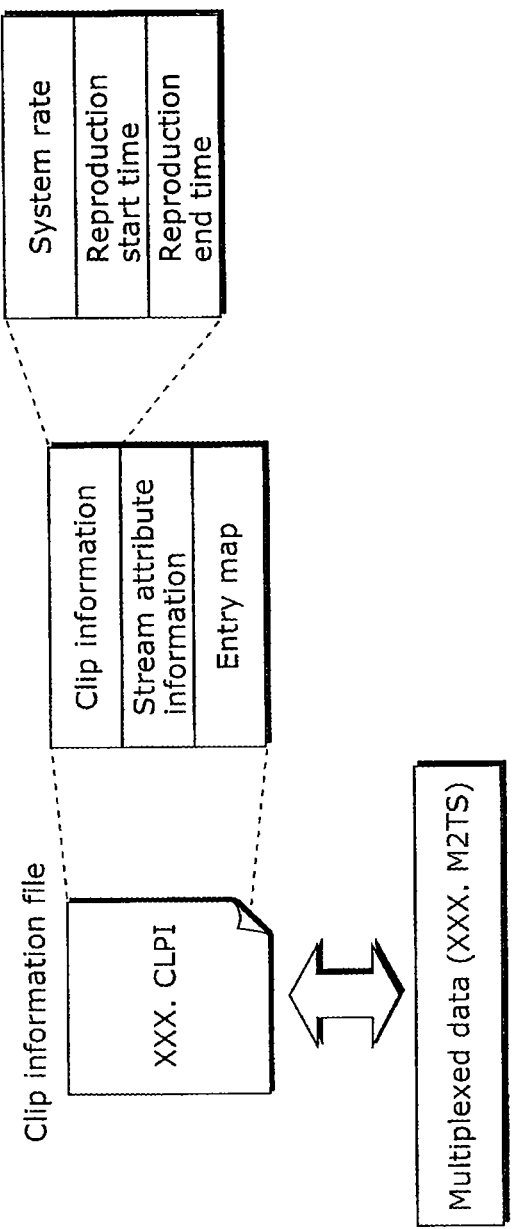
[FIG. 28]

Each of the multiplexed data information files is management information of the multiplexed data as shown in FIG. 28. The multiplexed data information files are in one to one correspondence with the multiplexed data, and each of the files includes multiplexed data information, stream attribute information, and an entry map.

As illustrated in FIG. 28, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 29:
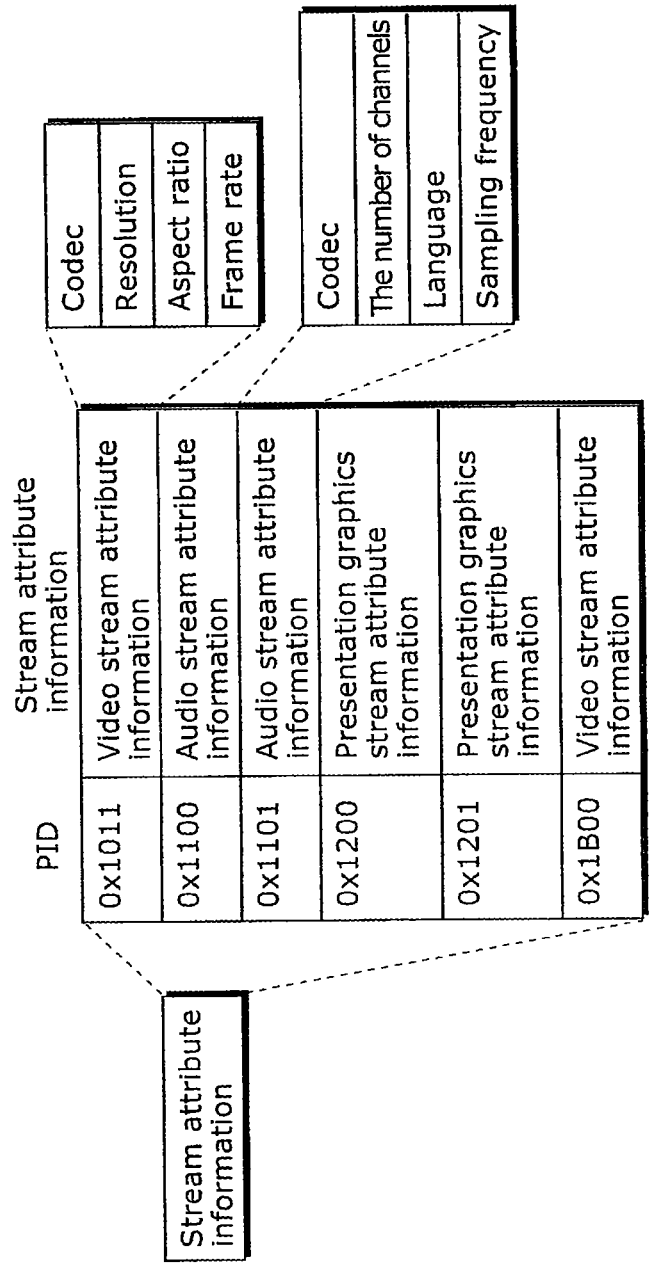
[FIG. 29]

As shown in FIG. 29, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 30:
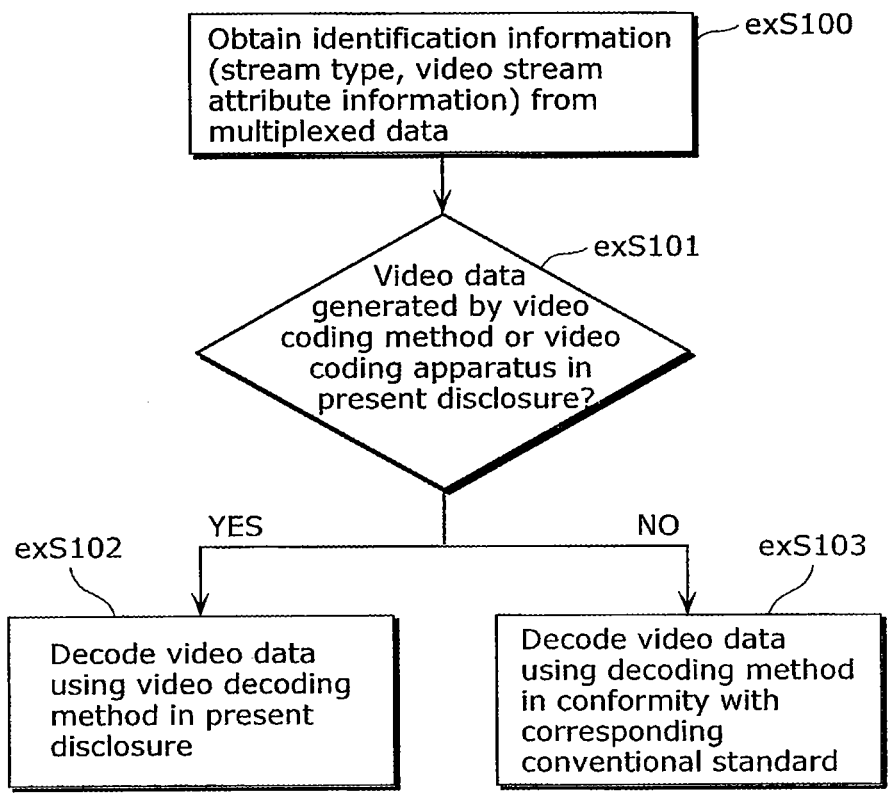
[FIG. 30]

Furthermore, FIG. 30 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

(Embodiment 5)

Figure 31:
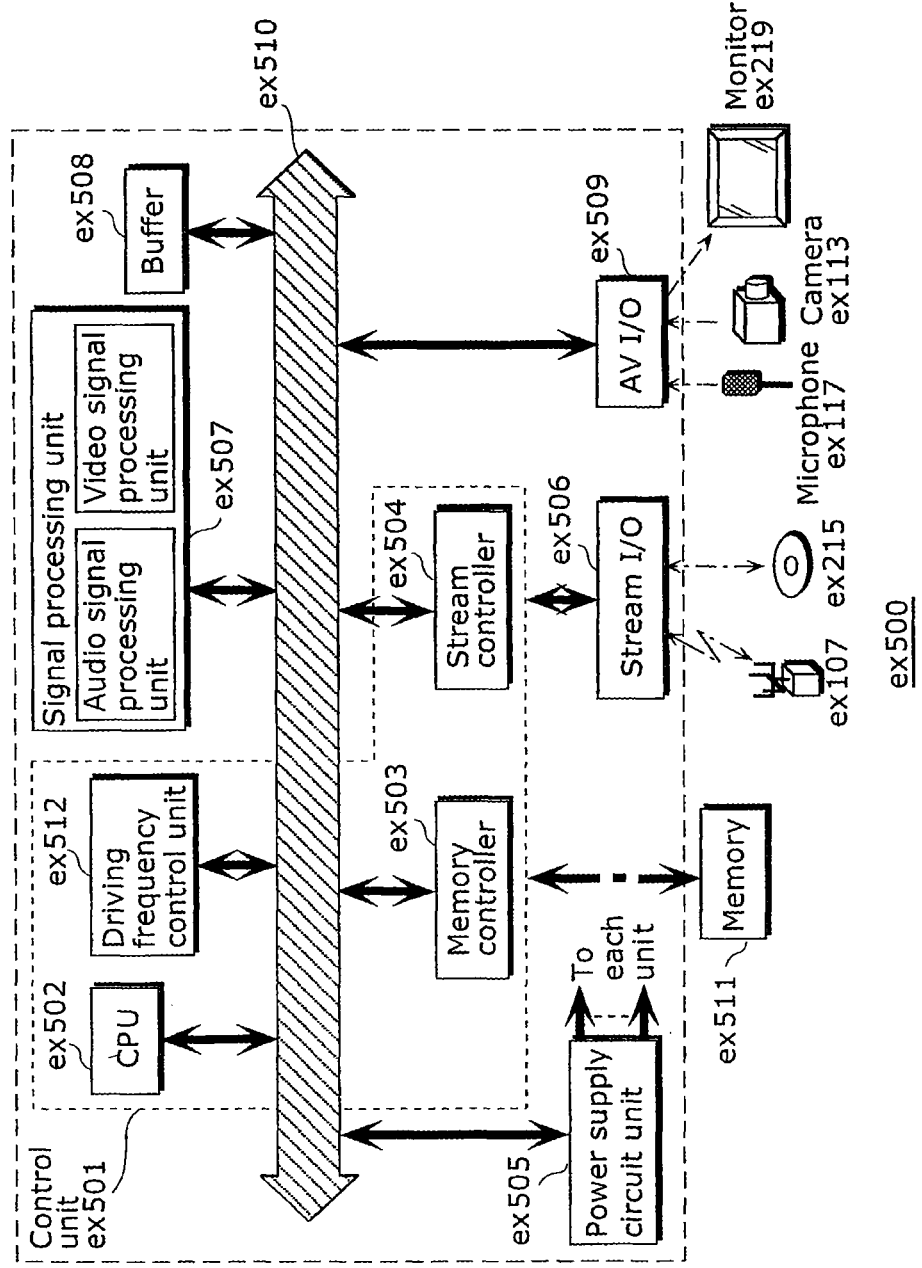
[FIG. 31]

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 31 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215.

When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present disclosure is applied to biotechnology.

(Embodiment 6)

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 32:
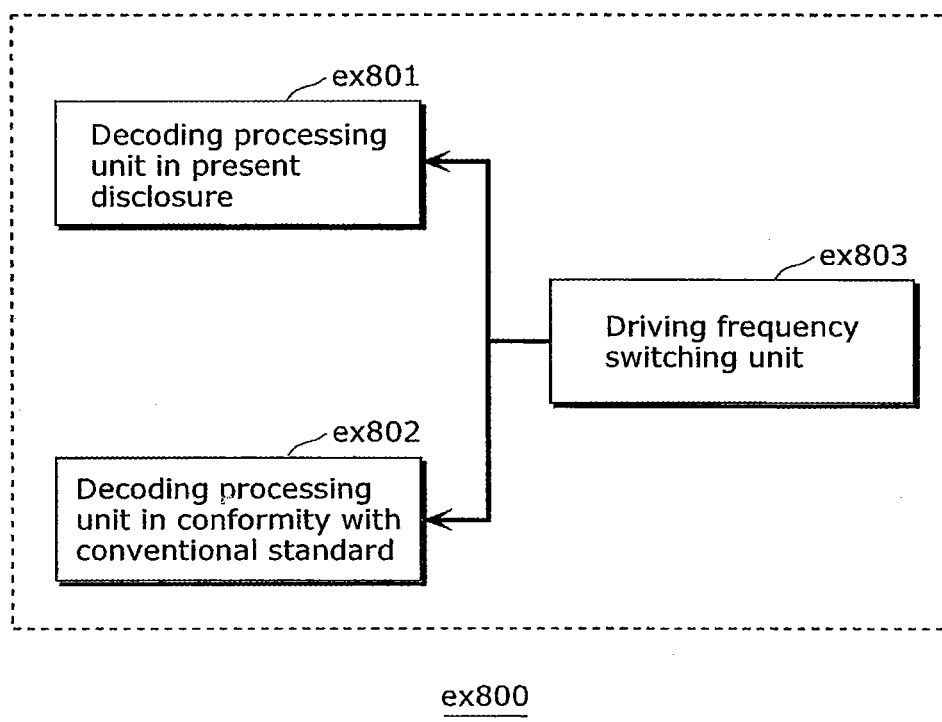
[FIG. 32]

In order to solve the problem, the moving picture decoding apparatus, such as the television ex300 and the LSI ex500 is configured to determine to which standard the video data conforms, and switch between the driving frequencies according to the determined standard. FIG. 32 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 31. Here, each of the decoding processing unit ex801 that executes the moving picture decoding method described in each of embodiments and the decoding processing unit ex802 that conforms to the conventional standard corresponds to the signal processing unit ex507 in FIG. 31. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 4 is probably used for identifying the video data. The identification information is not limited to the one described in Embodiment 4 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 34. The driving frequency can be selected by storing the look-up table in the buffer ex508 and in an internal memory of an LSI, and with reference to the look-up table by the CPU ex502.

Figure 33:
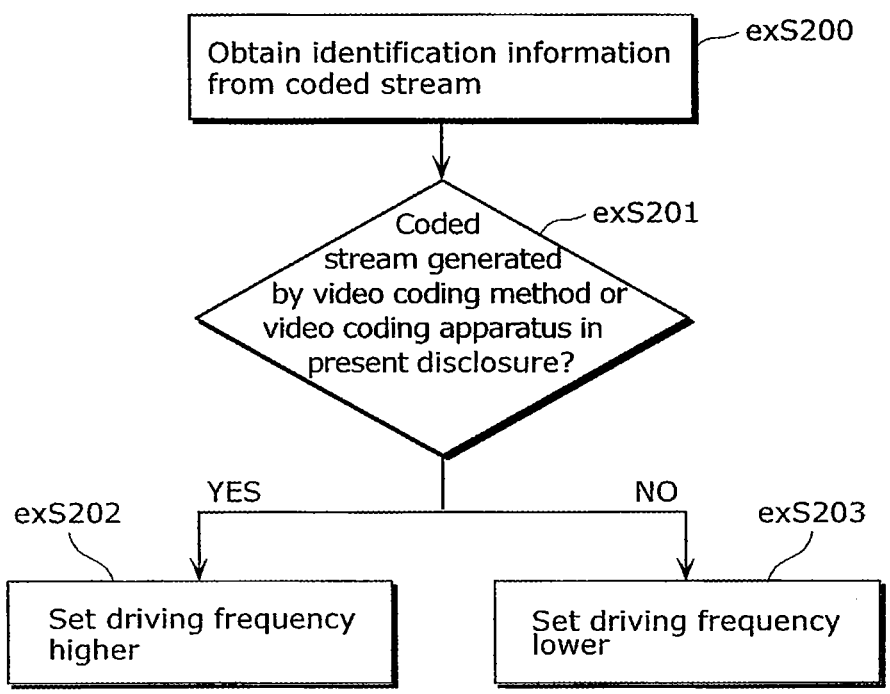
[FIG. 33]

FIG. 33 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

(Embodiment 7)

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 35A:
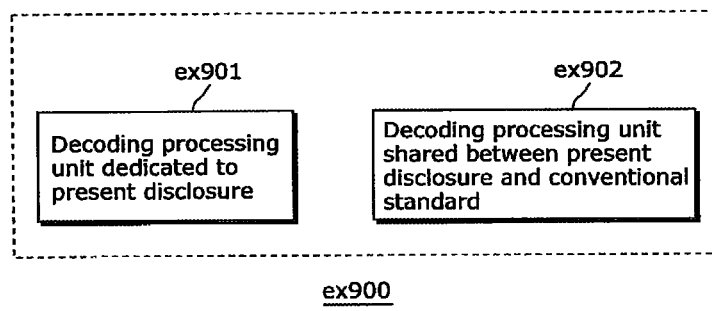
[FIG. 35A]

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 35A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present disclosure. Since the aspect of the present disclosure is characterized by entropy decoding in particular, for example, the dedicated decoding processing unit ex901 is used for entropy decoding. Otherwise, the decoding processing unit is probably shared for one of deblocking filtering, motion compensation, and inverse quantization or all of the processing. The decoding processing unit for implementing the moving picture decoding method described in each of embodiments may be shared for the processing to be shared, and a dedicated decoding processing unit may be used for processing unique to that of MPEG-4 AVC.

Figure 35B:
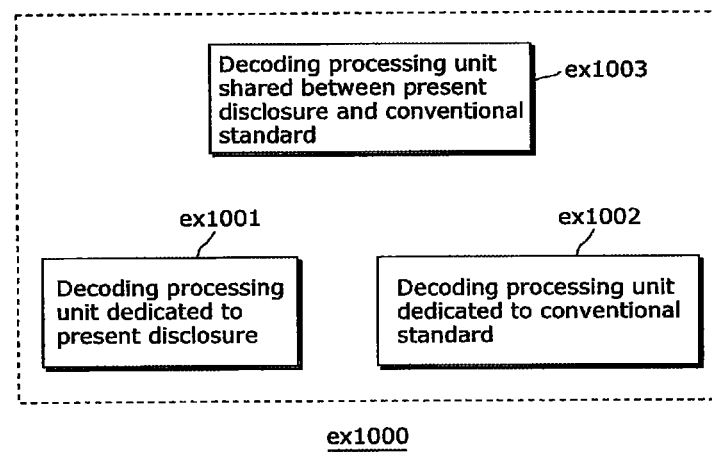
[FIG. 35B]

Furthermore, ex1000 in FIG. 35B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

Industrial Applicability

The image coding apparatus and the image decoding apparatus according to an aspect of the present disclosure are applicable to television receivers, digital video recorders, car navigation systems, mobile phones, digital cameras, or digital video cameras, for example.

The invention claimed is:

1. A decoding method for decoding last position information indicating a horizontal position and a vertical position of a last non-zero coefficient in a predetermined order within a current block to be decoded, the current block being included in a picture and including a plurality of coefficients, the decoding method comprising:

obtaining a bitstream including a first partial signal, a second partial signal, a third partial signal, and a fourth partial signal, in this order;

performing first arithmetic decoding on the first partial signal and the third partial signal respectively to obtain a decoded first partial signal and a decoded third partial signal, the first arithmetic decoding being context adaptive arithmetic decoding using a variable probability that is updated based on decoded last position information of a decoded block different from the current block;

performing second arithmetic decoding on the second partial signal and the fourth partial signal respectively to obtain a decoded second partial signal and a decoded fourth partial signal, the second arithmetic decoding being bypass decoding using a fixed probability;

deriving a horizontal component of the last position information indicating the horizontal position of the non-zero coefficient from the decoded first partial signal and the decoded third partial signal; and deriving a vertical component of the last position information indicating the vertical position of the non-zero coefficient from the decoded second partial signal and the decoded fourth partial signal.

2. A decoding apparatus which decodes last position information indicating a horizontal position and a vertical position of a last non-zero coefficient in a predetermined order within a current block to be decoded, the current block being included in a picture and including a plurality of coefficients, the decoding apparatus comprising:

processing circuitry; and storage coupled to the processing circuitry;

wherein the processing circuitry is configured to perform the following using the storage:

obtaining a bitstream including a first partial signal, a second partial signal, a third partial signal, and a fourth partial signal, in this order;

performing first arithmetic decoding on the first partial signal and the third partial signal respectively to obtain a decoded first partial signal and a decoded third partial signal;

performing second arithmetic decoding on the second partial signal and the fourth partial signal respectively to obtain a decoded second partial signal and a decoded fourth partial signal, the second arithmetic decoding being different from the first arithmetic decoding;

deriving a horizontal component of the last position information indicating the horizontal position of the non-zero coefficient from the decoded first partial signal and the decoded third partial signal; and deriving a vertical component of the last position information indicating the vertical position of the non-zero coefficient from the decoded second partial signal and the decoded fourth partial signal.

3. A decoding apparatus which decodes last position information indicating a horizontal position and a vertical position of a last non-zero coefficient in a predetermined order within a current block to be decoded, the current block being included in a picture and including a plurality of coefficients, the decoding apparatus comprising:

an obtainer configured to obtain a bitstream including a first partial signal, a second partial signal, a third partial signal, and a fourth partial signal, in this order;

an arithmetic decoder configured to:

perform a first arithmetic decoding on the first partial signal and the third partial signal respectively to obtain a decoded first partial signal and a decoded third partial signal; and perform a second arithmetic decoding on the second partial signal and the fourth partial signal respectively to obtain a decoded second partial signal and a decoded fourth partial signal, the second arithmetic decoding being different from the first arithmetic decoding; and a deriver configured to:

derive a horizontal component of the last non-zero coefficient indicting the horizontal position of the non-zero coefficient from the decoded first partial signal and the decoded third partial signal; and derive a vertical component of the last non-zero coefficient indicting the vertical position of the non-zero coefficient from the decoded second partial signal and the decoded fourth partial signal.

4. A non-transitory computer-readable recording medium, having a computer program recorded thereon, for causing the computer to execute the decoding method according to claim 1.

* * * * *